US012724428B2

(12) United States Patent
Pydin

(10) Patent No.: US 12,724,428 B2
(45) Date of Patent: Sep. 1, 2026

(54) WORK REGION SETTING DEVICE, WORK REGION SETTING SYSTEM, WORK REGION SETTING METHOD, AND STORAGE MEDIUM

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 18/884,186

(22) Filed: Sep. 13, 2024

(65) Prior Publication Data

US 2025/0093883 A1 Mar. 20, 2025

(30) Foreign Application Priority Data

Sep. 20, 2023 (JP) ................................ 2023-152321

(51) Int. Cl.

| | |
|---|---|
| ***G05D 1/648*** | (2024.01) |
| ***A01D 34/00*** | (2006.01) |
| ***A01D 101/00*** | (2006.01) |
| ***G05D 1/246*** | (2024.01) |
| ***G05D 1/698*** | (2024.01) |
| ***G05D 105/15*** | (2024.01) |
| ***G05D 107/20*** | (2024.01) |

(52) U.S. Cl.

CPC ......... *G05D 1/6482* (2024.01); *A01D 34/008* (2013.01); *G05D 1/246* (2024.01); *G05D 1/6987* (2024.01); *A01D 2101/00* (2013.01); *G05D 2105/15* (2024.01); *G05D 2107/23* (2024.01)

(58) Field of Classification Search

CPC .. G05D 2109/10; G05D 1/6482; G05D 1/246; G05D 1/6987; G05D 2105/15; G05D 2107/23; A01D 34/008; A01D 2101/00

See application file for complete search history.

(56) References Cited

U.S. PATENT DOCUMENTS

2016/0100522 A1* 4/2016 Yamauchi ............ G05D 1/0219 701/25
2020/0242861 A1* 7/2020 Dobashi ................. G07C 5/085

(Continued)

FOREIGN PATENT DOCUMENTS

JP 2021-153493 10/2021

*Primary Examiner* — Christopher George Fees

(74) *Attorney, Agent, or Firm* — Amin, Turocy & Watson, LLP

(57) ABSTRACT

A work region setting device includes a processor executes computer-readable instructions to perform acquiring map information about a work region and work machine information about a plurality of work machines, deciding the work target region for each of the work machines for performing the work in a work range of a work region designated based on the map information, setting the decided work target region for each work machine, and transmitting the work target region to the work machine. The work machines include a first second work machines. The deciding of the work target region includes deciding a region including an edge of a boundary line located around the work range as a second work target region of the second work machine and deciding a region of the work range inside of the second work target region as a first work target region of the first work machine.

7 Claims, 10 Drawing Sheets

(56) References Cited

U.S. PATENT DOCUMENTS

| | | | | |
|---|---|---|---|---|
| 2021/0302980 | A1* | 9/2021 | Yamamura | G05D 1/0217 |
| 2021/0302999 | A1* | 9/2021 | Yokoyama | G05D 1/0274 |
| 2021/0365044 | A1* | 11/2021 | Xue | G05D 1/0289 |
| 2022/0295696 | A1* | 9/2022 | Holgersson | G05D 1/0274 |
| 2023/0259878 | A1* | 8/2023 | Jacquemart | G06Q 10/087<br>705/28 |
| 2024/0172576 | A1* | 5/2024 | Ferrier | G05D 1/648 |

* cited by examiner

START

S300: OBTAIN WORK TIME UNTIL LAWNMOWER 200 AND LAWNMOWER 300 COMPLETE LAWN MOWING WORK

S310: IS WORK TIME DIFFERENCE LESS THAN OR EQUAL TO TIME THRESHOLD VALUE ?

YES → S330: UPDATE WORK TARGET REGION FOR EACH OF LAWNMOWER 200 AND LAWNMOWER 300

NO → S320: NARROW WORK TARGET REGION FOR LAWNMOWER 200 AND WIDEN WORK TARGET REGION FOR LAWNMOWER 300

END

WORK REGION SETTING DEVICE, WORK REGION SETTING SYSTEM, WORK REGION SETTING METHOD, AND STORAGE MEDIUM

CROSS-REFERENCE TO RELATED APPLICATION

Priority is claimed on Japanese Patent Application No. 2023-152321, filed Sep. 20, 2023, the content of which is incorporated herein by reference.

BACKGROUND OF THE INVENTION

Field of the Invention

The present invention relates to a work region setting device, a work region setting system, a work region setting method, and a storage medium.

Description of Related Art

Conventionally, technology related to a system for adjusting a work region where work machines share and perform work so that the work machines complete the work in the same period when a plurality of work machines are allowed to perform work in work areas (work regions) such as parks, golf courses, and fields has been proposed (for example, see Japanese Unexamined Patent Application, First Publication No. 2021-153493). In the conventional technology, an area of a work region to be assigned to each work machine is adjusted in consideration of the work efficiency of each of the work machines sharing the work, and therefore the work machines complete the work processes in the same period.

However, each of the work machines sharing the work is not always able to perform the work with certain work efficiency. For example, the work efficiency may be different between the time when the work machine performs the work while performing straight movement in the work region and the time when the work machine performs the work while performing turning movement at a position of a boundary portion of the work region. Because the number of times the work machine turns in the work region also differs according to a shape of a boundary portion (a boundary line) of the work region, the work efficiency will be affected thereby. For this reason, when the work region where the work machines share work is adjusted, if the work region to be assigned is not adjusted in consideration of a work efficiency difference between the straight movement time and the turning movement time (as well as the number of turns or the like) in each work machine, the work machines will not be able to complete the work processes in the same period. Then, the accuracy of estimating the work time for the work region becomes inferior.

SUMMARY OF THE INVENTION

The present invention has been made on the basis of the recognition of the above problem and an objective of the present invention is to provide a work region setting device, a work region setting system, a work region setting method, and a storage medium for enabling a more preferred work region to be assigned to each work machine when a plurality of work machines share work in the same work region.

A work region setting device, a work region setting system, a work region setting method, and a storage medium according to the present invention adopt the following configurations.

(1): According to an aspect of the present invention, there is provided a work region setting device for deciding and setting a work target region that is a target where work is shared and performed by a plurality of work machines that autonomously move and perform work within a work region, the work region setting device including a processor configured to execute computer-readable instructions to perform: acquiring map information including at least a whole of the work region and work machine information including information about at least work efficiency of the plurality of work machines; deciding the work target region for each of the work machines for performing the work in a work range of a work region designated based on the map information; setting the decided work target region for each work machine; and transmitting the work target region to the work machine, wherein the plurality of work machines include a first work machine having high work efficiency and configured not to perform the work on an edge of a boundary line located around the work range, and a second work machine having lower work efficiency than the first work machine and configured to perform the work on the edge, and wherein the deciding of the work target region includes: deciding a region located around the work range including the edge as a second work target region of the second work machine; and deciding a region of the work range inside of the second work target region as a first work target region of the first work machine.

(2): In the above-described aspect (1), the deciding of the work target region includes: deciding a region of a width of a second work area in which the second work machine can perform the work per unit time along the edge of the work range as the second work target region, deciding a sequentially moved region as the first work target region so that a region of a first work area in which the first work machine can perform the work per unit time comes into contact with the inside of the second work target region, and establishing the second work target region by adding a region that is not decided to be the first work target region in the work range to the second work target region.

(3): In the above-described aspect (2), the deciding of the work target region includes: determining whether a difference between a first distance of a first straight line from a center position of the first work target region to a first position on a boundary line between the first work target region and the second work target region and a second distance of a second straight line from the center position to a second position adjacent to the first position on the boundary line is less than or equal to a distance threshold value; and when a determination result indicates that the difference between the first distance and the second distance is not less than or equal to the distance threshold value, obtaining a third position where the difference is less than or equal to the distance threshold value on a straight line corresponding to a longer distance between the first distance and the second distance, updating the first work target region using the third position as a position on the boundary line, and establishing the second work target region by adding a region that is no longer the first work target region due to an update of the first work target region to the second work target region.

(4): In the above-described aspect (3), the deciding of the work target region includes: determining whether or not a difference between a first work time required for the first work machine to complete the work for the first work target region and a second work time required for the second work machine to complete the work for the second work target region is less than or equal to a time threshold value; and when a determination result indicates that the difference between the first work time and the second work time is not less than or equal to the time threshold value, updating the first work target region so that the first work target region is narrowed, and updating the second work target region so that the second work target region is widened by adding a decrement region by which the first work target region is narrowed due to the update of the first work target region to the second work target region.

(5): In the above-described aspect (4), the deciding of the work target region includes: updating the first work target region so that the first work target region is narrowed from an outer circumferential end with largest curvature in the first work target region.

(6): In the above-described aspect (1), the first work machine and the second work machine are lawnmowers.

(7): According to an aspect of the present invention, there is provided a work region setting system for causing a plurality of work machines, which autonomously move and perform work within a work region, to share and perform the work, the work region setting system including: a first work machine having high work efficiency and configured not to perform the work on an edge of a boundary line located around the work range; a second work machine having lower work efficiency than the first work machine and configured to perform the work on the edge; and a work region setting device configured to decide and set a work target region that is a target where each work machine is allowed to perform the work, wherein the work region setting device includes a processor configured to execute computer-readable instructions to perform: acquiring map information including at least a whole of the work region and work machine information including information about at least work efficiency of the plurality of work machines; deciding the work target region for each of the work machines for performing the work in a work range of a work region designated based on the map information; setting the decided work target region for each work machine; and transmitting the work target region to the work machine, and wherein the deciding of the work target region includes: deciding a region located around the work range including the edge as a second work target region of the second work machine; and deciding a region of the work range inside of the second work target region as a first work target region of the first work machine.

(8): According to an aspect of the present invention, there is provided a work region setting method including: acquiring, by a computer of a work region setting device for deciding and setting a work target region that is a target where work is shared and performed by a plurality of work machines that autonomously move and perform work within a work region, map information including at least a whole of the work region and work machine information including information about at least work efficiency of the plurality of work machines; and when the work target region is decided for each of the work machines for performing the work in a work range of a work region designated based on the map information, wherein the work machines include a first work machine having high work efficiency and configured not to perform the work on an edge of a boundary line located around the work range and a second work machine having lower work efficiency than the first work machine and configured to perform the work on the edge, deciding, by the computer, a region located around the work range including the edge as a second work target region of the second work machine, deciding, by the computer, a region of the work range inside of the second work target region as a first work target region of the first work machine, and transmitting, by the computer, the work target region to each work machine when the decided work target region is set for each work machine.

(9): According to an aspect of the present invention, there is provided a non-transitory computer-readable storage medium storing a program for causing a computer of a work region setting device for deciding and setting a work target region that is a target where work is shared and performed by a plurality of work machines that autonomously move and perform work within a work region to: acquire map information including at least a whole of the work region and work machine information including information about at least work efficiency of the plurality of work machines; and when the work target region is decided for each of the work machines for performing the work in a work range of a work region designated based on the map information, wherein the work machines include a first work machine having high work efficiency and configured not to perform the work on an edge of a boundary line located around the work range and a second work machine having lower work efficiency than the first work machine and configured to perform the work on the edge, decide a region located around the work range including the edge as a second work target region of the second work machine, decide a region of the work range inside of the second work target region as a first work target region of the first work machine, and transmit the work target region to each work machine when the decided work target region is set for each work machine.

According to the above-described aspects (1) to (9), it is possible to assign a more preferred work region to each work machine when a plurality of work machines share work in the same work region.

DETAILED DESCRIPTION OF THE INVENTION

Figure 1:
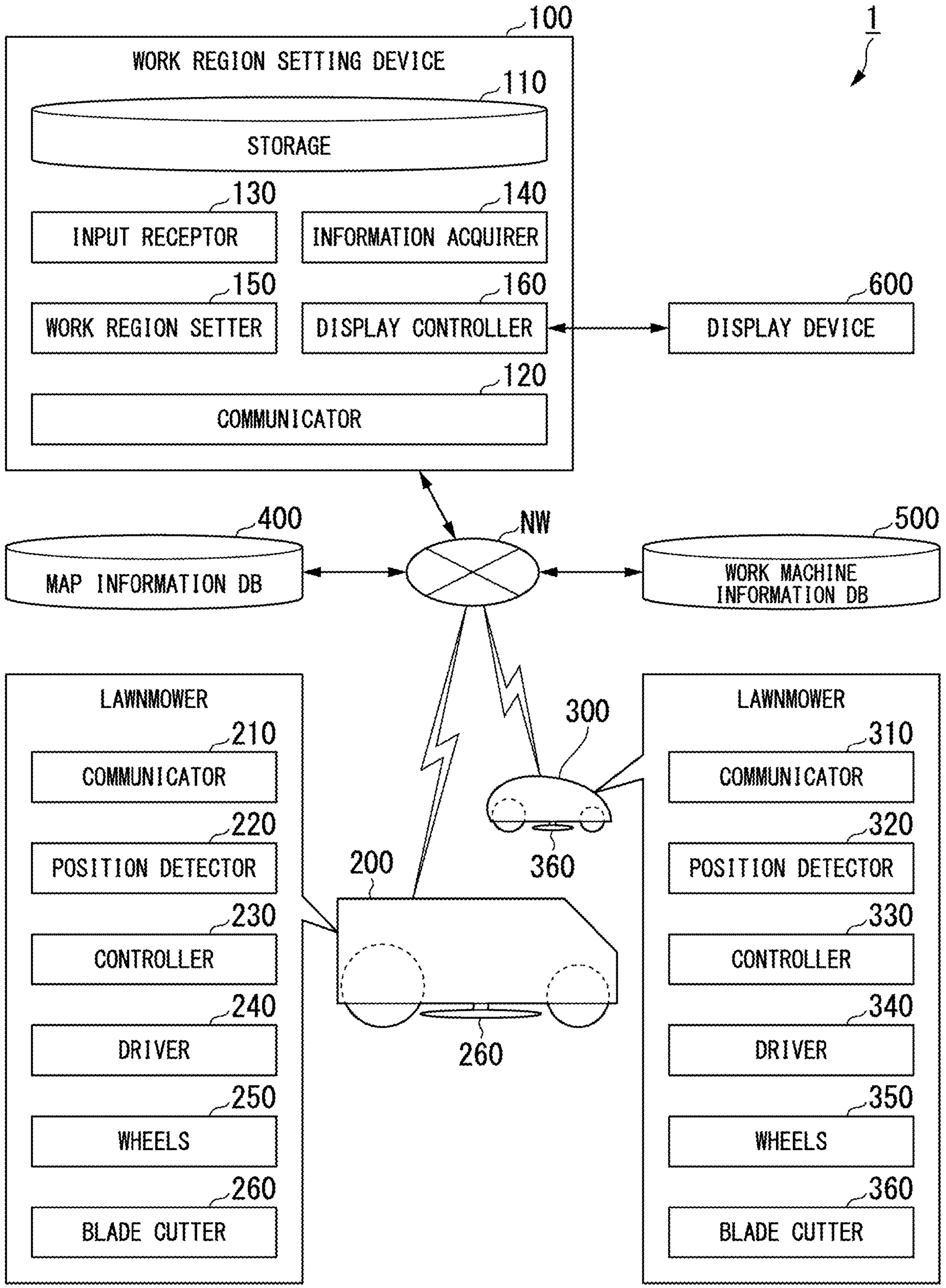
FIG. 1 is a diagram showing an example of a configuration of a work region setting device according to an embodiment and an example of a usage environment of a work region setting system including the work region setting device.

Hereinafter, embodiments of a work region setting device, a work region setting system, a work region setting method, and a storage medium of the present invention will be described with reference to the drawings. As used throughout this disclosure, the singular forms "a," "an," and "the" include a plurality of references unless the context clearly dictates otherwise. In the drawings referred to in the following description, the scale of each constituent element or member is appropriately altered and shown to make each constituent element or member recognizable.

In the following description, for example, it is assumed that a work region is a lawn region where a lawn is growing, a work machine is a lawnmower that mows the lawn, and a work region setting system includes a work region setting device that causes two lawnmowers to share lawn mowing work.

[Usage Environment of Work Region Setting System]

FIG. 1 is a diagram showing an example of a configuration of a work region setting device according to an embodiment and an example of a usage environment of a work region setting system including the work region setting device. In a work region setting system 1, for example, a work region setting device 100, a lawnmower 200, and a lawnmower 300 perform communication via a network NW. The network NW is a wireless communication network including the Internet, a wide area network (WAN), a local area network (LAN), a provider device, a wireless base station, and the like.

In the work region setting system 1, for example, a user such as a lawn region manager gives an instruction for mowing the lawn growing in a lawn region (a work region) to the work region setting device 100. In FIG. 1, an example in which a display device 600 for presenting information about the lawn region (the work region) and work machines (here, lawnmowers 200 and 300) to the user when the work region setting system 1 receives the instruction from the user is connected to the work region setting device 100 is shown. The display device 600 is, for example, a liquid crystal display (LCD) or an organic electroluminescence (EL) display for visually presenting the information to the user or the like.

The work region setting device 100 decides a target region (hereinafter referred to as a "work target region") where each of the lawnmower 200 and the lawnmower 300 mows the lawn in accordance with the instruction from the user. Also, the work region setting device 100 transmits information about the decided work target region to each of the lawnmower 200 and the lawnmower 300 via the network NW so that the decided work target region is set. Thereby, each of the lawnmower 200 and the lawnmower 300 performs lawn mowing work for mowing the lawn growing in the work target region transmitted and set by the work region setting device 100.

A database (DB) storing data used when the work region setting device 100 decides the work target region is also connected to the network NW. More specifically, a map information DB 400 in which map information including the work target region is stored and a work machine information DB 500 in which information about the work machines including the lawnmower 200 and the lawnmower 300 is stored are each connected to the network NW.

The map information DB 400 stores map information including at least a whole of the lawn region (the work region). The map information is, for example, referred to as an orthoimage. The map information (the orthoimage), for example, is generated on the basis of an aerial image obtained by photographing the work region from above with a flying object such as a satellite or drone equipped with an imaging device. The aerial image includes information indicating a focal length during photography (in other words, information indicating an angle of view of photography in the imaging device). Furthermore, for example, information indicating a position of a flying object itself (a geographical position of latitude, longitude, altitude, or the like) measured on the basis of a signal received from a satellite constituting a global navigation satellite system (GNSS) such as a Global Positioning System (GPS) or information indicating a photography direction of the aerial image is associated with the aerial image. The map information (the orthoimage) is generated by a map image generation device (not shown) (which may be a server device) for such an aerial image, for example, by performing a predetermined process for eliminating the distortion occurring in the aerial image.

Here, because the aerial image is an image of central projection using the center of a lens provided in the imaging device as a viewpoint, a subject image shown in the aerial image is distorted due to a difference in a distance from the center of the lens to a subject (i.e., the lawn region). That is, the angle, size, and position of the subject image represented by each pixel constituting the aerial image have a deviation (hereinafter referred to as a "position deviation") with respect to the actual angle, size, and position (a geographical position of latitude, longitude, altitude, or the like). The position deviation in each pixel constituting the aerial image increases as the altitude of the imaging device (i.e., the flying object), which captures the aerial image, from the ground increases and in a direction from the center of the aerial image (i.e., the center of the lens) to the periphery of the aerial image. Furthermore, the position deviation in each pixel constituting the aerial image is also caused by the relief (height difference) of the land in the lawn region (the work region) and the length (height) of the lawn. For this reason, for example, a map image generation device (not shown) generates the map information (the orthoimage) by eliminating the position deviation occurring in each pixel constituting the aerial image and performing a process of transforming an aerial image, which is a central projection image, into an orthogonal projection image (an ortho transformation process) so that each pixel constituting the map information (orthoimage) represents a subject image of the correct size in the correct position without any tilt as if the subject were photographed from directly above. Because the map information (the orthoimage) accurately shows the shape and position of the subject image, the work region setting device 100 can use the map information (the orthoimage) when deciding a work target region, thereby deciding and adjusting a position, size (area), distance, or the like of the work target region where each of the lawnmowers 200 and 300 will mow the lawn with high accuracy.

The work machine information DB 500 stores work machine information including at least information about the lawnmower 200 and the lawnmower 300. The work machine information is, for example, information about the work efficiency of the work machine. The work machine information corresponding to the lawnmower 200 and the lawnmower 300 includes information about work efficiency such as, for example, a work area [$m^2$/min] in which it is possible to perform lawn mowing work per unit time. The work efficiency includes information such as a work area [$m^2$/min] when each lawnmower mows a lawn while performing straight movement and a work area [$m^2$/min] when each lawnmower mows a lawn while performing turning movement. The work machine information, for example, may be provided by a manufacturer of the work machine or may be input by the user of the work region setting device 100 on the basis of information from the manufacturer of the work machine and the like. By using work machine information when deciding the work target region, the work region setting device 100 can take into account the work efficiency when each of the lawnmowers 200 and 300 mows the lawn, and more accurately decide and adjust a position, size (area), distance, and the like of the work target region where the lawnmowers 200 and 300 will share lawn mowing work.

[Configurations of Work Machines]

Next, configurations of the lawnmower 200 and the lawnmower 300 will be described.

First, the configuration of the lawnmower 200 will be described. The lawnmower 200 is an unmanned (autonomous) lawnmower that autonomously moves within the work target region transmitted and set by the work region setting device 100 and performs lawn mowing work for mowing a lawn growing in the work target region. The lawnmower 200 is a large lawnmower with high work efficiency for mowing a lawn. That is, the lawnmower 200 can mow a lawn of a wider region simultaneously. However, the lawnmower 200 has lower work efficiency when mowing a lawn while performing turning movement than when mowing a lawn while performing straight movement. The lawnmower 200 includes, for example, a communicator 210, a position detector 220, a controller 230, a driver 240, wheels 250, and a blade cutter 260. FIG. 1 shows an example in which the blade cutter 260 is attached to a main body of the lawnmower 200.

The communicator 210 communicates with the work region setting device 100 via the network NW and receives information about the work target region transmitted by the work region setting device 100. The communicator 210 outputs the received information about the work target region to the controller 230.

The position detector 220 detects a position of the lawnmower 200 itself on the basis of, for example, a signal received from a satellite constituting the GNSS. The position detector 220 outputs information indicating the position of the detected lawnmower 200 (hereinafter referred to as "position information") to the controller 230.

The controller 230 controls the whole of the lawnmower 200. More specifically, the controller 230 sets information about the work target region from the work region setting device 100 output by the communicator 210 as the work target region where the lawnmower 200 performs lawn mowing work and controls the driver 240 and the wheels 250 so that the lawnmower 200 autonomously moves within the set work target region on the basis of position information output by the position detector 220. At this time, the controller 230 controls the blade cutter 260 so that the blade cutter 260 mows the lawn during autonomous movement.

The driver 240 drives the wheels 250 during autonomous movement of the lawnmower 200 or the blade cutter 260 during lawn mowing in accordance with control from the controller 230. The driver 240 is, for example, an electric motor or an internal combustion engine such as an engine according to electric power supplied from a battery (a secondary battery). The driver 240 may drive the wheels 250 or the blade cutter 260 by combining an electric motor and an internal combustion engine. The driver 240 controls a driving force to be supplied to the wheel 250 or a driving force to be supplied to the blade cutter 260 in accordance with control from the controller 230.

The wheels 250 move the lawnmower 200 by rotating with the driving force supplied by the driver 240. The wheels 250 are controlled by the controller 230 in a direction in which the lawnmower 200 is moving and heading. That is, the wheels 250 are controlled by the controller 230 for speed control and steering control when the lawnmower 200 moves.

The blade cutter 260 is attached to a lower part of the main body of the lawnmower 200 (a so-called chassis unit) and mows a lawn by rotating the blade with the drive force supplied by the driver 240. The blade cutter 260 has a configuration in which its position can be changed in a vertical direction (a direction perpendicular to the surface of the chassis) with respect to the surface on which the lawn is mowed, for example, so that the length of the lawn is changed after mowing. Although an example in which one large blade cutter 260 is attached to the main body of the lawnmower 200 is shown in FIG. 1, the blade cutter 260 may include a plurality of blade cutters because the lawnmower 200 is a large lawnmower with high work efficiency for mowing a lawn.

The configuration of the lawnmower 200 shown in FIG. 1 is only an example, and the lawnmower 200 may include various constituent elements and functions in addition to or instead of the constituent elements and functions described above. For example, the lawnmower 200 may include a storage (not shown) to store information about the set work target region or the controller 230 may store a program to be executed when controlling the constituent elements of the lawnmower 200, various setting values, and the like. For example, the lawnmower 200 may include various sensors such as a contact sensor, a wheel speed sensor, and a gyro sensor and the controller 230 may control autonomous movement of the lawnmower 200 on the basis of information detected by each sensor and on the basis of whether or not the lawnmower 200 is in contact with an obstacle or a foreign object, whether or not the lawnmower 200 can move at a predetermined speed, a current posture of the lawnmower 200, and the like.

Next, a configuration of the lawnmower 300 will be described. Like the lawnmower 200, the lawnmower 300 is also an unmanned (autonomous) lawnmower that autonomously moves within the work target region transmitted and set by the work region setting device 100 and performs lawn mowing work for mowing a lawn growing in the work target region. The lawnmower 300 is a small lawnmower whose work efficiency for mowing a lawn is lower than that of the lawnmower 200. For this reason, a work region for the lawnmower 300 is smaller than that for the lawnmower 200 when the lawn can be mowed thereby at the same time therein. However, the lawnmower 300 has a small turn and can be moved in a narrower work region to mow a lawn. Furthermore, even if there is an obstacle by which the lawnmower 200 cannot mow the lawn, for example, such as a wall or a fence, the lawnmower 300 can mow the lawn growing at the edge of the obstacle. Also, in the lawnmower 300, the work efficiency when a lawn is mowed while straight movement is performed is the same as the work efficiency when a lawn is mowed while turning movement is performed. The lawnmower 300 includes, for example, a communicator 310, a position detector 320, a controller 330, a driver 340, wheels 350, and a blade cutter 360. FIG. 1 shows an example of a state in which the blade cutter 360 is attached to the main body of the lawnmower 300.

Because the functions of the communicator 310, the position detector 320, the controller 330, the driver 340, the wheels 350, and the blade cutter 360 provided in the lawnmower 300 are similar to the functions of the communicator 210, the position detector 220, the controller 230, the driver 240, the wheels 250, and the blade cutter 260 provided in the lawnmower 200, a detailed description of the functions will be omitted.

The configuration of the lawnmower 300 shown in FIG. 1 is only an example, and the lawnmower 300 may include various constituent elements and functions in addition to or instead of the constituent elements and functions described above.

Figure 2:
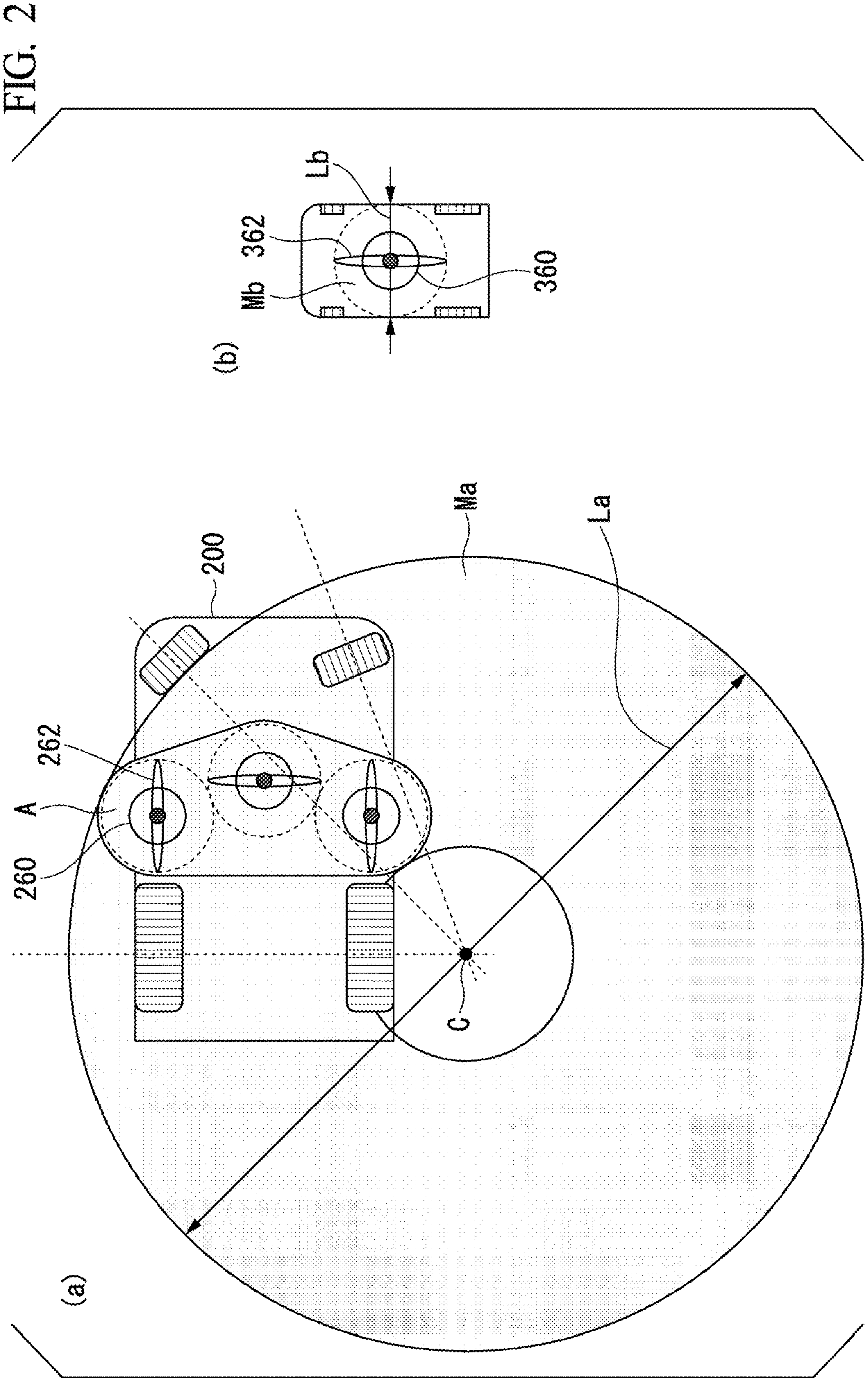
FIG. 2 is a diagram schematically showing an example of a lawn mowing region for a work machine controlled by the work region setting device according to the embodiment.

Here, an example of a region where each of the lawnmower 200 and the lawnmower 300 can mow a lawn (hereinafter referred to as a "lawn mowing region") will be described. That is, a work efficiency difference between the lawnmower 200 and the lawnmower 300 will be described. FIG. 2 is a diagram schematically showing an example of lawn mowing regions for the work machines (the lawnmower 200 and the lawnmower 300) to be controlled by the work region setting device 100 according to the embodiment. In FIG. 2, examples of the lawnmower 200 and the lawnmower 300 as viewed from a side where the blade cutter is attached, i.e., a lower side where the lawn is mowed, are shown. In FIG. 2(*a*), an example of an arrangement of each blade cutter 260 when the lawnmower 200 has a configuration of three blade cutters 260 and an example of the size of a lawn mowing region where the lawnmower 200 can mow a lawn are shown. In FIG. 2(*b*), an example of an arrangement of the blade cutter 360 when the lawnmower 300 is configured to include one blade cutter 360 and an example of the size of a lawn mowing region where the blade cutter 360 can mow a lawn are shown. The difference of work efficiency for mowing a lawn between the lawnmower 200 and the lawnmower 300 is represented by the sizes of the lawn mowing regions shown in FIG. 2.

In the lawnmower 200, blades 262 of the three blade cutters 260 rotate synchronously, such that the lawn is mowed in a state in which the blades 262 do not come into contact with each other. In the lawnmower 200, a part of a region A of a circle in which each blade cutter 260 mows a lawn is arranged to overlap a part of a region A of another blade cutter 260 adjacent thereto. Thereby, in the lawnmower 200, the width of the lawn mowing region for mowing the lawn is expanded to a region close to a combination of the widths of three regions A. In the lawnmower 200, a region of a circle having the smallest rotational diameter that can be rotated by the control of steering is a smallest mowing region where the lawn can be mowed. In FIG. 2(*a*), when the lawnmower 200 rotates using a center C as a rotation center, a region of a circle of a rotational diameter La is the minimum lawn mowing region Ma in the lawnmower 200. As shown in FIG. 2(*a*), when the lawnmower 200 mows the lawn while rotating, the wheel 250 is located outside the region A of the blade cutter 260, i.e., outside the minimum lawn mowing region Ma. For this reason, for example, when an obstacle such as a wall or a fence is located on the boundary line of the lawn region (the work region), the lawnmower 200 cannot set a work target region so that the boundary line and the lawn mowing region Ma are in contact. That is, the lawnmower 200 has a device configuration in which it is not possible to perform lawn mowing work on the edge of the boundary line located around the work range.

The lawnmower 300 mows a lawn at the same width as the main body of the lawnmower 300 when the blade 362 of one blade cutter 360 rotates. Thereby, the lawnmower 300 can mow the lawn growing at the edge. In FIG. 2(*b*), the case where a region of a circle having a rotational diameter Lb of the blade cutter 360 is a lawn mowing region Mb in the lawnmower 300 is shown. For example, even if an obstacle such as a wall or a fence is located on the boundary line of the lawn region (the work region), the lawnmower 300 can set a work target region so that this boundary line and the lawn mowing region Mb are in contact. That is, the lawnmower 300 has a device configuration in which lawn mowing work can be performed on the edge of the boundary line located around the work range.

The lawnmower 200 is an example of a "first work machine." The lawnmower 300 is an example of a "second work machine." The lawn mowing region Ma is an example of a "first work area" and the lawn mowing region Mb is an example of a "second work area."

[Configuration of Work Region Setting Device]

Next, a configuration of the work region setting device 100 will be described. The work region setting device 100 decides the work target region for mowing a lawn in which the lawnmower 200 and the lawnmower 300 share the work in accordance with, for example, an instruction from a user such as a lawn region manager, and transmits the decided work target region to each of the lawnmower 200 and the lawnmower 300 via the network NW. The work region setting device 100 includes, for example, a storage 110, a communicator 120, an input receptor 130, an information acquirer 140, a work region setter 150, and a display controller 160.

The input receptor 130, the information acquirer 140, the work region setter 150, and the display controller 160 include, for example, a hardware processor such as a central processing unit (CPU) and a storage device (a storage device including a non-transitory storage medium) storing a program (software), and the function of each constituent element is implemented by the processor executing the program. Some or all of these constituent elements are implemented by hardware (a circuit unit including circuitry) such as a large-scale integration (LSI) circuit, an application-specific integrated circuit (ASIC), and a field-programmable gate array (FPGA), or a graphics processing unit (GPU) or the like or may be implemented by software and hardware in cooperation. Some or all of the functions of these constituent elements may be implemented by a dedicated LSI circuit. Here, the program (software) may be stored in the storage 110, a semiconductor memory element such as a read-only memory (ROM), a random-access memory (RAM), or a flash memory and a storage device (a storage device including a non-transitory storage medium)

such as a hard disk drive (HDD) provided in the work region setting device 100 in advance. Alternatively, the program (software) may be stored in a removable storage medium (a non-transitory storage medium) such as a DVD or a CD-ROM and installed in the storage device provided in the work region setting device 100 when the storage medium is mounted in a drive device provided in the work region setting device 100. The program (software) may be downloaded from another computer device via the network NW and installed in the storage device provided in the work region setting device 100. The work region setting device 100 may be implemented in a server device or a storage device incorporated in a cloud computing system. In this case, the function of the work region setting device 100 may be implemented by a plurality of server devices and storage devices in the cloud computing system.

The storage 110 stores, for example, data of the above-described program (software) and data of each processing stage in the work region setting device 100. The storage 110, for example, may store map information (an orthoimage) including the entire work region acquired by the information acquirer 140 from the map information DB 400 and the work machine information acquired by the information acquirer 140 from the work machine information DB 500. Further, the storage 110 may store information about the work target region set by the work region setter 150 for each of the lawnmower 200 and the lawnmower 300. In this case, when the lawn is mowed by the same work machine (the lawnmower 200 and the lawnmower 300) for the same work region for the second or subsequent time, a process of acquiring map information and work machine information and a process of deciding a work target region can be omitted.

Although a case where the storage 110 is a storage provided in the work region setting device 100 is shown in FIG. 1, the storage 110 may be a storage arranged outside the work region setting device 100. In this case, the storage 110 may have a configuration connected to the work region setting device 100 via the network NW or may have a configuration connected to the work region setting device 100 by a dedicated network circuit different from the network NW.

The communicator 120 is a communication interface such as a network card for connecting to the network NW. The communicator 120 communicates with the lawnmower 200, the lawnmower 300, the map information DB 400, and the work machine information DB 500 via the network NW. The communicator 120 receives the map information transmitted from the map information DB 400 and the work machine information transmitted from the work machine information DB 500 via the network NW and outputs the received map information and the received work machine information to the input receptor 130. The communicator 120 transmits information about the set work target region to each of the lawnmower 200 and the lawnmower 300 via the network NW. Communication with the map information DB 400 and the work machine information DB 500 through the communicator 120 may be wired communication or wireless communication. Communication with the lawnmower 200 and the lawnmower 300 through the communicator 120 may be wireless communication.

The input receptor 130 receives an input from the user of the work region setting device 100. More specifically, the input receptor 130 receives information indicating a position for mowing a lawn, for example, such as an address of the lawn region, and information indicating a range of a work region for mowing the lawn input by the user. Further, the input receptor 130 receives information for designating a work machine for mowing a lawn (here, the lawnmower 200 and the lawnmower 300) input by the user. The input receptor 130 includes, for example, an input device that is manipulated by the user and used to input information such as a mouse or a keyboard. Also, the display controller 160 causes the display device 600 to display a user interface screen for the user to input information. Thereby, the input receptor 130 can allow the user to input information by manipulating the input device while viewing the user interface screen displayed on the display device 600. The input receptor 130 may be, for example, a touch panel in which the display device 600 and the input device are integrated. In this case, the user can perform a manipulation (for example, a tap manipulation, a long press manipulation, or the like) on the user interface screen displayed on the display device 600 to input information to the work region setting device 100 (more specifically, the input receptor 130). The input receptor 130 outputs the received information indicating the position where the lawn is mowed (hereinafter referred to as "work position information"), information indicating the range of the work region for mowing the lawn (hereinafter referred to as "work range information"), and information for designating a work machine for mowing the lawn (hereinafter referred to as "designated work machine information") to the information acquirer 140. The input receptor 130 may be configured to store the received information in the storage 110 and notify the information acquirer 140 that the information is stored in the storage 110.

The input receptor 130 may receive, for example, an aerial image obtained by photographing the work region from above with a flying object such as a drone equipped with an imaging device. This aerial image may be a single image including the entire work region or the entire work region may be represented by a plurality of aerial images. The input receptor 130 outputs the received aerial images (including a plurality of aerial images) to the information acquirer 140. The input receptor 130 may be configured to cause the storage 110 to store the received aerial image and notify the information acquirer 140 that the aerial image is stored in the storage 110.

The information acquirer 140 acquires information used to decide the work target region on the basis of the information from the user received by the input receptor 130. More specifically, when the work position information is input by the input receptor 130, the information acquirer 140 acquires map information corresponding to the input work position information from the map information DB 400 through the communicator 120. Also, the information acquirer 140 outputs the map information acquired from the map information DB 400 to the work region setter 150. The information acquirer 140 may output the map information acquired from the map information DB 400 to the display controller 160 and the display controller 160 may cause the display device 600 to display a user interface screen including the map information. Thereby, the user can manipulate the input device of the input receptor 130 while viewing the map information displayed on the display device 600 to input work range information and designated work machine information. When information indicating the work range information is input by the input receptor 130, the information acquirer 140 outputs the input work range information to the work region setter 150. When the designated work machine information is input by the input receptor 130, the information acquirer 140 acquires the input work machine information corresponding to the work machine from the work machine information DB 500 through the communicator 120. Also, the information acquirer 140 outputs the work machine information acquired from the work machine information DB 500 to the work region setter 150.

When an aerial image has been input from the input receptor 130, the information acquirer 140 may create map information (an orthoimage) including at least the entire work region on the basis of the aerial image. Because the creation of the map information (the orthoimage) in the information acquirer 140 can be performed by existing technology, detailed description thereof will be omitted. The information acquirer 140 outputs the created map information (orthoimage) to the work region setter 150 like the map information acquired from the map information DB 400. The information acquirer 140 may output the created map information (orthoimage) to the display controller 160. The display controller 160 may include the created map information in the user interface screen and cause the display device 600 to display the user interface screen. Thereby, even if the information acquirer 140 creates the map information (the orthoimage), the user can manipulate the input device of the input receptor 130 while viewing the map information (the orthoimage) displayed on the display device 600 to input the work range information or the designated work machine information.

On the basis of the map information, work range information, and work machine information output by the information acquirer 140, the work region setter 150 decides a work target region that is a target where lawn mowing work is shared and performed by the work machines (here, the lawnmower 200 and the lawnmower 300) designated by the user. The work region setter 150 transmits the decided work target region to each of the lawnmower 200 and the lawnmower 300 through the communicator 120 so that the decided work target region is set. The work region setter 150 outputs information indicating the decided work target region to the display controller 160 and the display controller 160 may cause the display device 600 to display a user interface screen indicating the work target region in the map information. Thereby, the user may confirm the work target region displayed on the display device 600, manipulate the input device of the input receptor 130, and instruct the lawnmower 200 and the lawnmower 300 to start lawn mowing work for the work target region. In this case, the work region setter 150 transmits the decided work target region for each of the lawnmower 200 and the lawnmower 300 through the communicator 120 after the user issues an instruction to start the lawn mowing work so that the decided work target region is set.

The display controller 160 controls the display of the user interface screen for visually presenting information to the user. More specifically, the display controller 160 receives an input from the user through the input receptor 130, generates a user interface screen for presenting map information acquired by the information acquirer 140 and information about the work target region decided by the work region setter 150 to the user, outputs the generated user interface screen to the display device 600, and causes the display device 600 to display the generated user interface screen.

[Work Target Region Decision Process]

Figure 3:
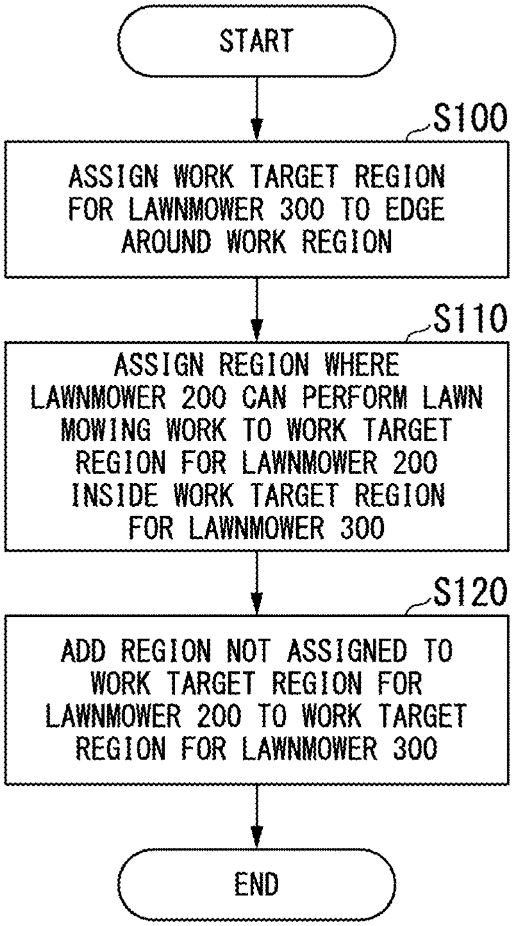
FIG. 3 is a flowchart showing an example of a flow of a process in which the work region setting device according to the embodiment decides a work target region.
Figure 4:
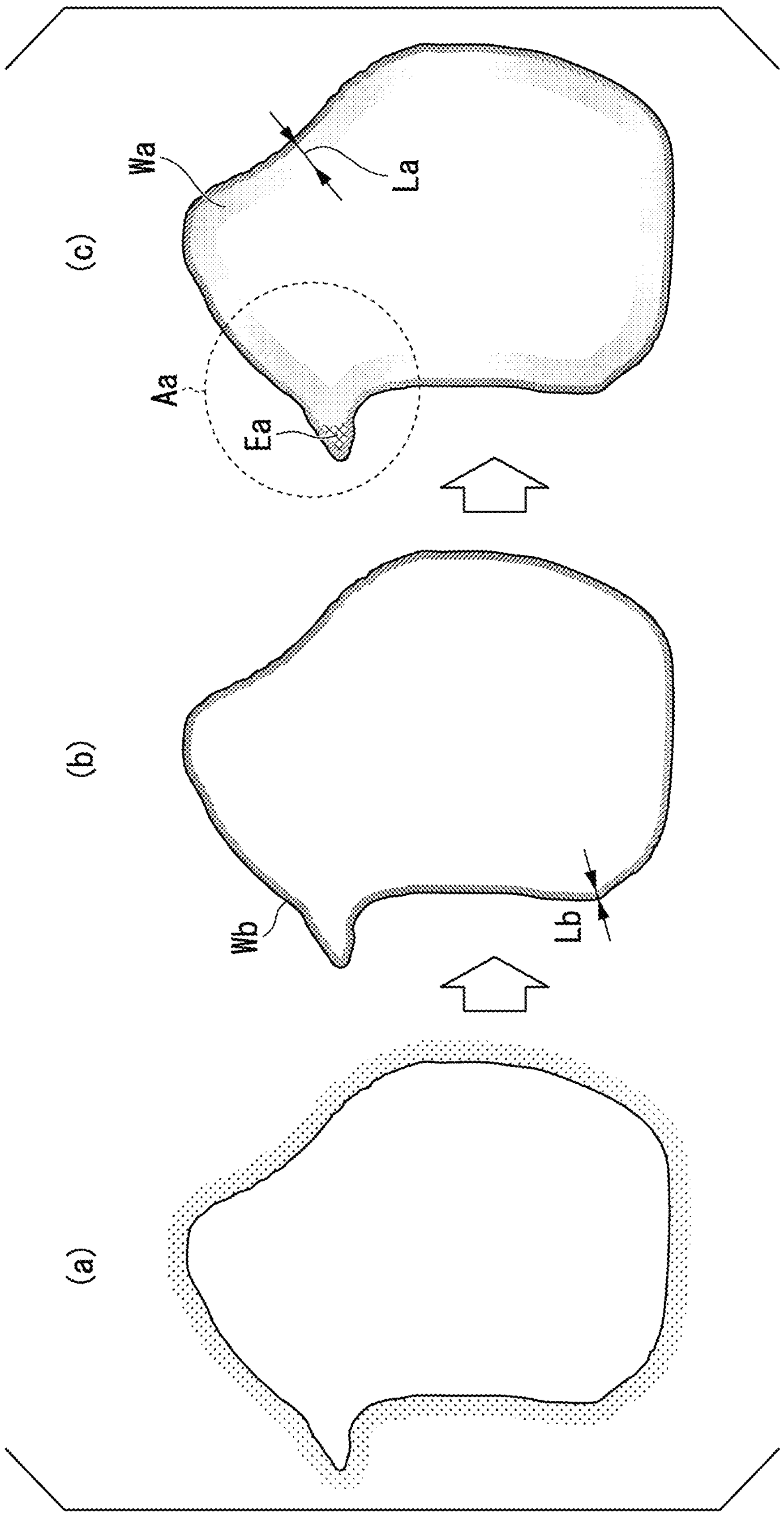
FIG. 4 is a diagram schematically showing an example of the work target region decided by the work region setting device according to the embodiment.
Figure 5:
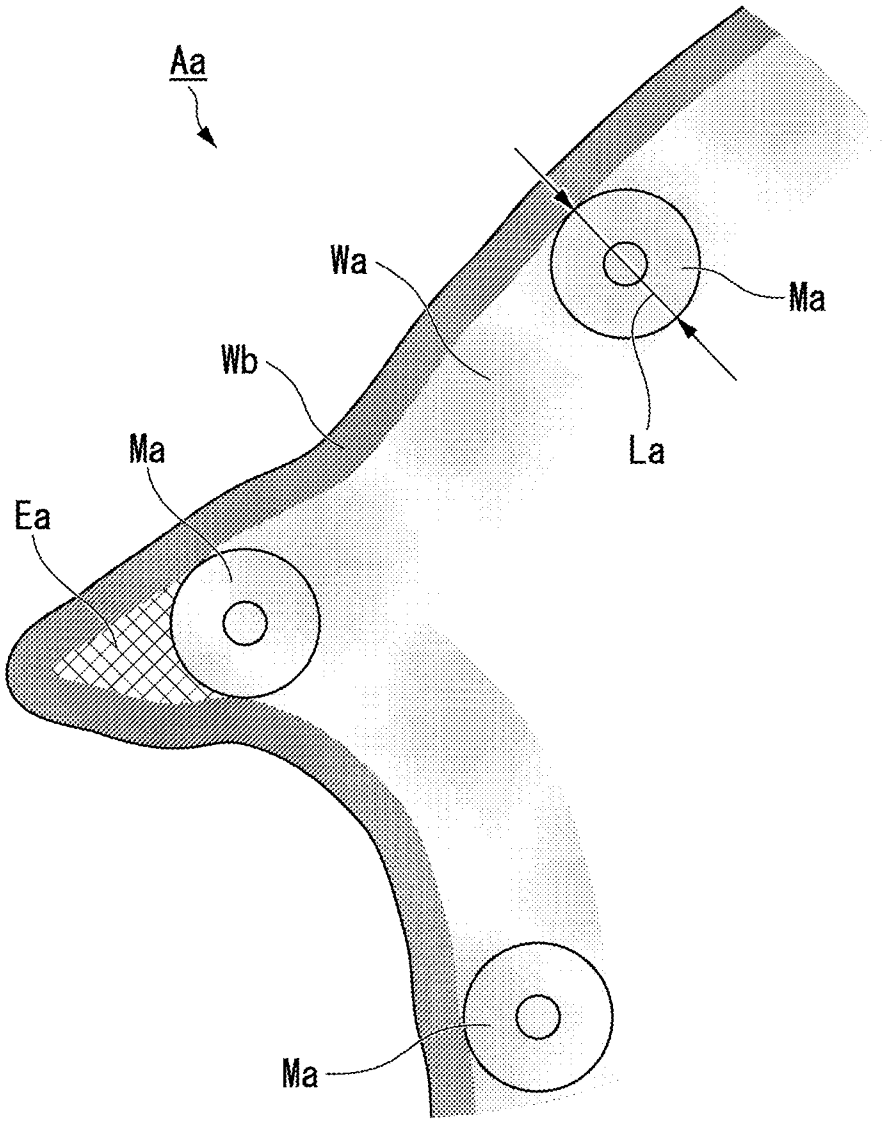
FIG. 5 is a diagram schematically showing an example of the work target region decided by the work region setting device according to the embodiment.
Figure 6:
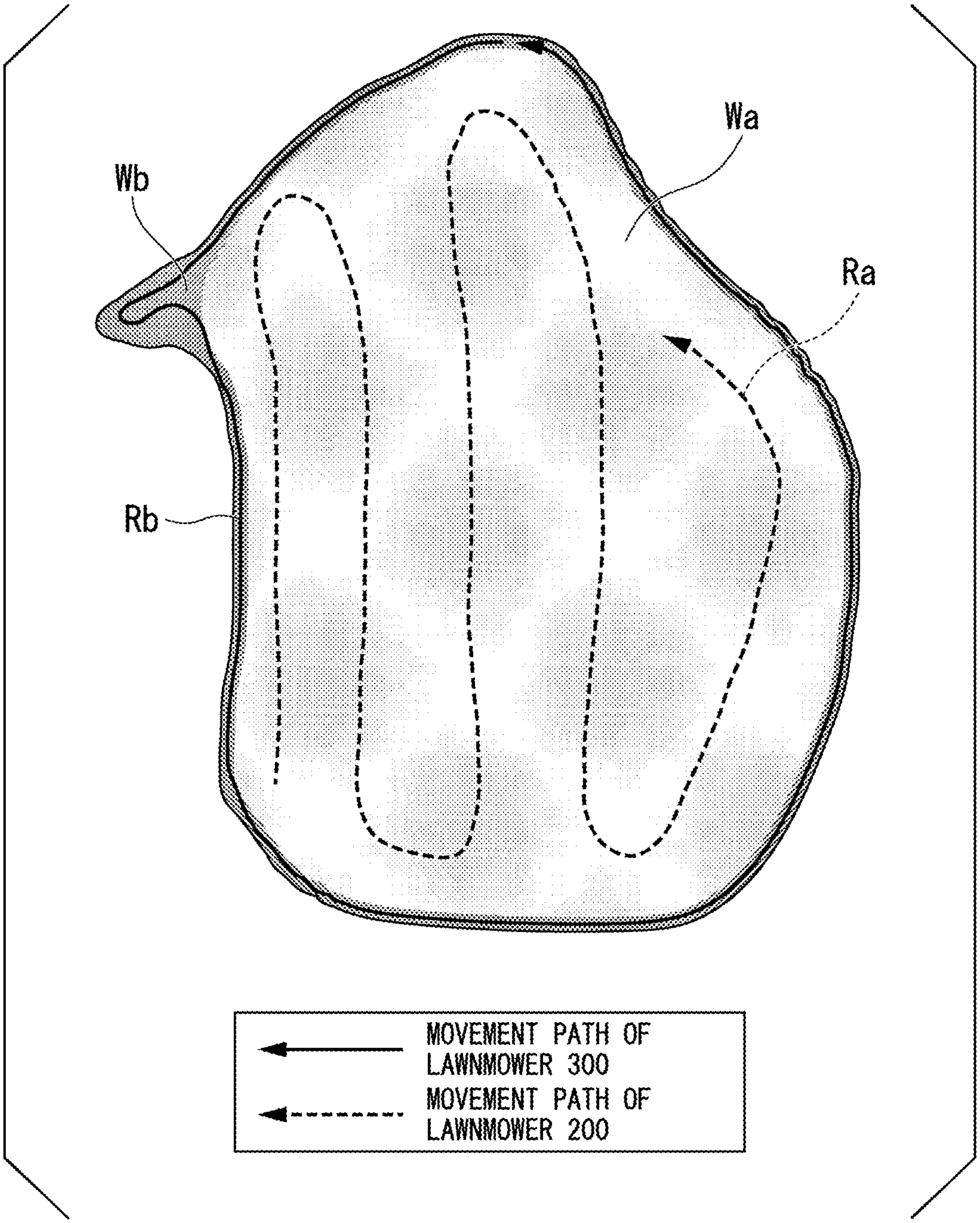
FIG. 6 is a diagram schematically showing an example in which each work machine moves in the work target region decided by the work region setting device according to the embodiment.

Next, an example of a work target region decision process in the work region setter 150 will be described. FIG. 3 is a flowchart showing an example of a flow of a process in which the work region setting device 100 according to the embodiment decides a work target region. FIGS. 4 and 5 are diagrams schematically showing an example of a work target region decided by the work region setting device 100 according to the embodiment. FIG. 6 is a diagram schematically showing an example in which each work machine (the lawnmower 200 and the lawnmower 300) moves in the work target region decided by the work region setting device 100 according to the embodiment. In the following description, in a flow of the work target region decision process of the work region setting device 100 shown in FIG. 3, an example shown in FIGS. 4 to 6 will be described with appropriate reference.

In the following description, it is assumed that the input receptor 130 has already received inputs of work position information, work range information, and designated work machine information from the user and the information acquirer 140 acquires map information and work machine information on the basis of the received information and outputs the received information to the work region setter 150. In FIG. 4(*a*), an example of map information corresponding to the work position information received from the input of the user is shown. Here, it is assumed that a part of the boundary line of the work region is surrounded by an obstacle, which interferes with lawn mowing work of the lawnmower 200, such as a wall, in the region of the map information shown in FIG. 4(*a*). Also, it is assumed that the entire region of the map information shown in FIG. 4(*a*) is indicated by the user as work range information, i.e., the entire range of the map information is the work region.

When the work target region decision process starts, the work region setter 150 first assigns the work target region for the lawnmower 300 to the edge around the work region (step S100). More specifically, the work region setter 150 can decide a region capable of being decided by sequentially moving the lawn mowing region Mb for the lawnmower 300 along the edge around the work region, i.e., a region of a width of a diameter Lb of a circle in which the blade 362 of the blade cutter 360 provided in the lawnmower 300 rotates, as the work target region for the lawnmower 300. In FIG. 4(*b*), a state in which a region having the width of the diameter Lb along the edge around the work region is decided as a work target region Wb for the lawnmower 300 is shown. The work region setter 150 may decide a region having an integer multiple of the width of the diameter Lb as the work target region Wb. That is, the work region setter 150 may decide a region where the lawnmower 300 rotates a plurality of times along the edge around the work region as the work target region Wb.

Subsequently, the work region setter 150 assigns a region where the lawnmower 200 can mow the lawn inside the work target region for the lawnmower 300, i.e., within a work region remaining in the processing of step S100, to a work target region for the lawnmower 200 (step S110). More specifically, the work region setter 150 sequentially moves a minimum lawn mowing region Ma for the lawnmower 200 along the work target region Wb for the lawnmower 300 (i.e., sequentially moves a minimum lawn mowing region Ma for the lawnmower 200 so that at least one point of the lawn mowing region Ma is in contact with the work target region Wb) to decide a range outside the work target region for the lawnmower 200. In FIG. 4(*c*), a state in which a region having a width of a rotational diameter La of the minimum lawn mowing region Ma for the lawnmower 200 is decided as a work target region Wa for the lawnmower 200 is shown. Further, in FIG. 5, a state in which a portion of a region Aa in the work region shown in FIG. 4(*c*) is enlarged, the minimum lawn mowing region Ma for the lawnmower 200 is sequentially moved, and the work target region Wa for the lawnmower 200 is decided is shown in more detail. Also, the work region setter 150 decides the entire region inside a range outside the decided work target region for the lawnmower 200 as the work target region for the lawnmower 200.

Also, the work region setter 150 adds a region not assigned to the work target region for the lawnmower 200 to the work target region for the lawnmower 300 (step S120). More specifically, the work region setter 150 includes a region that is not assigned to the work target region for the lawnmower 200 in the processing of step S110, i.e., a region which is smaller than the minimum lawn mowing region Ma for the lawnmower 200 and in which the lawnmower 200 cannot perform lawn mowing work, in the work target region for the lawnmower 300. For example, in FIGS. 4(*c*) and 5, a work region Ea is a work region where the lawnmower 200 cannot move to perform lawn mowing work. For this reason, the work region setter 150 adds the work region Ea to the work target region Wb that has already been decided and decides (establishes) an addition result as the final work target region Wb for the lawnmower 300.

In this work target region decision process, the work region setter 150 decides a work target region that is a target where lawn mowing work is shared and performed by the lawnmower 200 and the lawnmower 300. More specifically, in the work target region decision process, the work region setter 150 decides the work target region Wb for the lawnmower 300 as a small lawnmower that has low work efficiency for mowing the lawn and is capable of mowing the lawn with a small turn in a narrow work region including an edge, and the work target region Wa for the lawnmower 200 as a large lawnmower that has high work efficiency for mowing the lawn, is capable of mowing the lawn in a wider work region, but is unable to mow the lawn in the narrow work region including the edge. Also, the work region setter 150 transmits the decided work target region to each of the lawnmower 200 and the lawnmower 300 through the communicator 120 so that the decided work target region is set. Thereby, each of the lawnmower 200 and the lawnmower 300 moves within the work target region decided and set by the work region setter 150 to perform lawn mowing work for mowing the lawn. In FIG. 6, an example of a movement path Ra along which the lawnmower 200 moves in the work target region Wa when performing lawn mowing work and an example of a movement path Rb along which the lawnmower 300 moves in the work target region Wb when performing lawn mowing work are shown. Thereby, the lawnmower 200 and the lawnmower 300 share and perform lawn mowing work for the entire range of map information indicated in the work range information indicated by the user.

The work target region Wa is an example of a "first work target region" and the work target region Wb is an example of a "second work target region."

[First Adjustment Process for Work Target Region]

Figure 7:
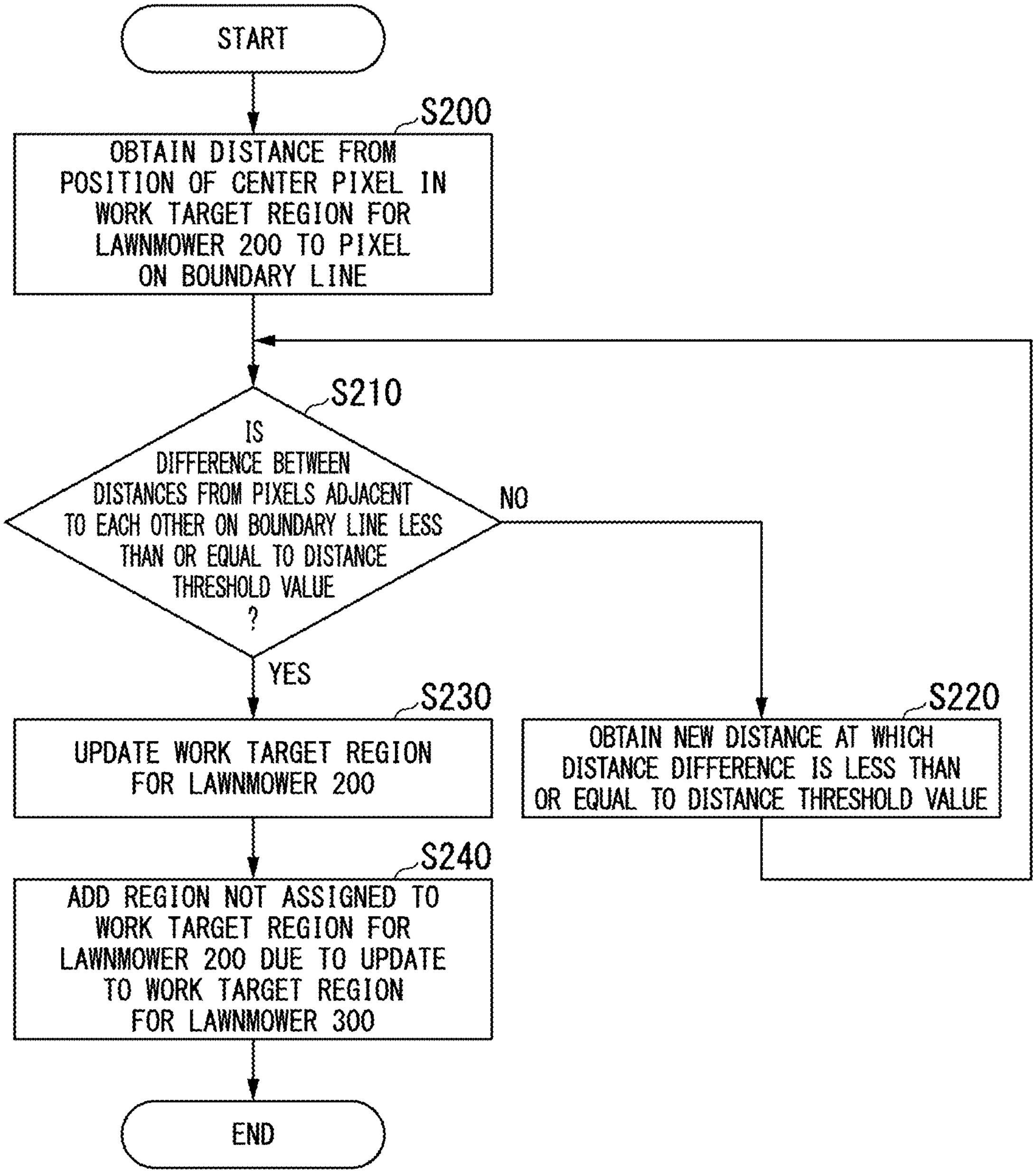
FIG. 7 is a flowchart showing an example of a flow of a first process of adjusting the work target region decided by the work region setting device according to the embodiment.
Figure 8:
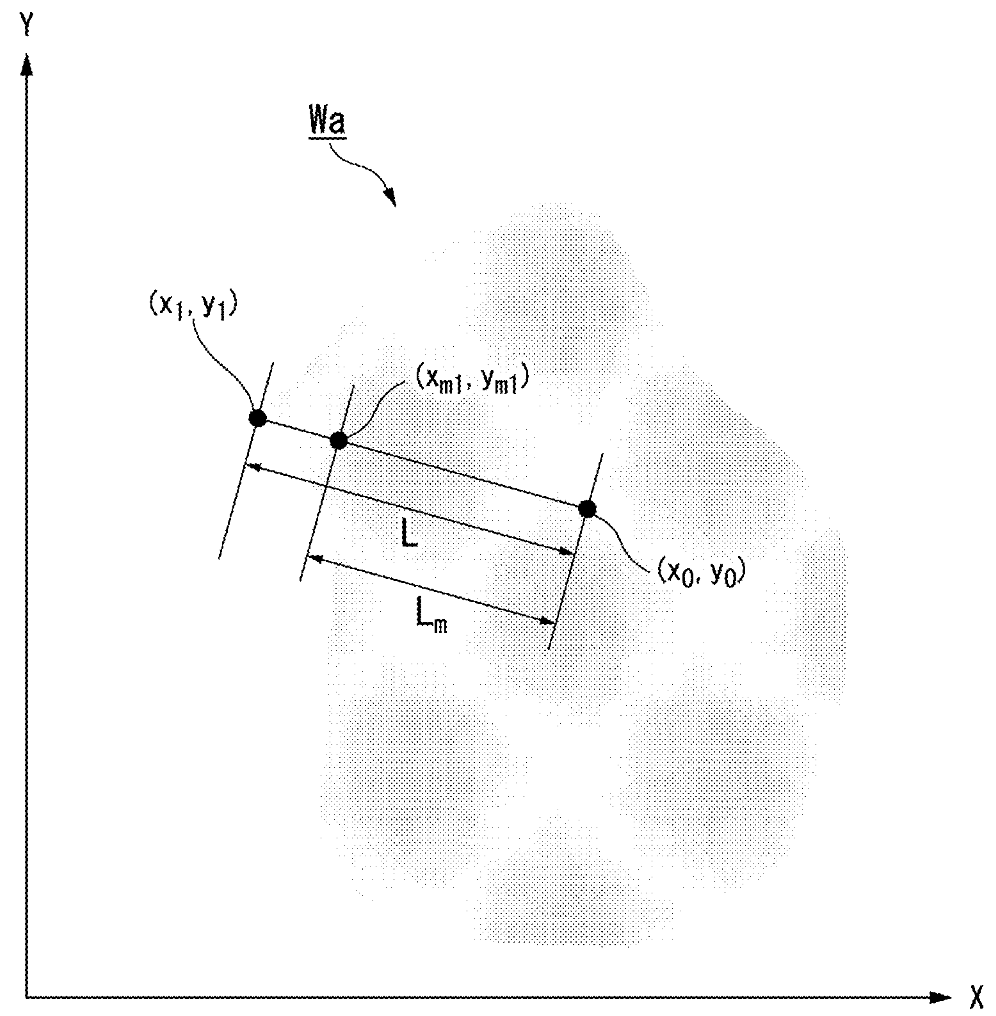
FIG. 8 is a diagram schematically showing an example of a flow of a first process of adjusting the work target region decided by the work region setting device according to the embodiment.
Figure 9:
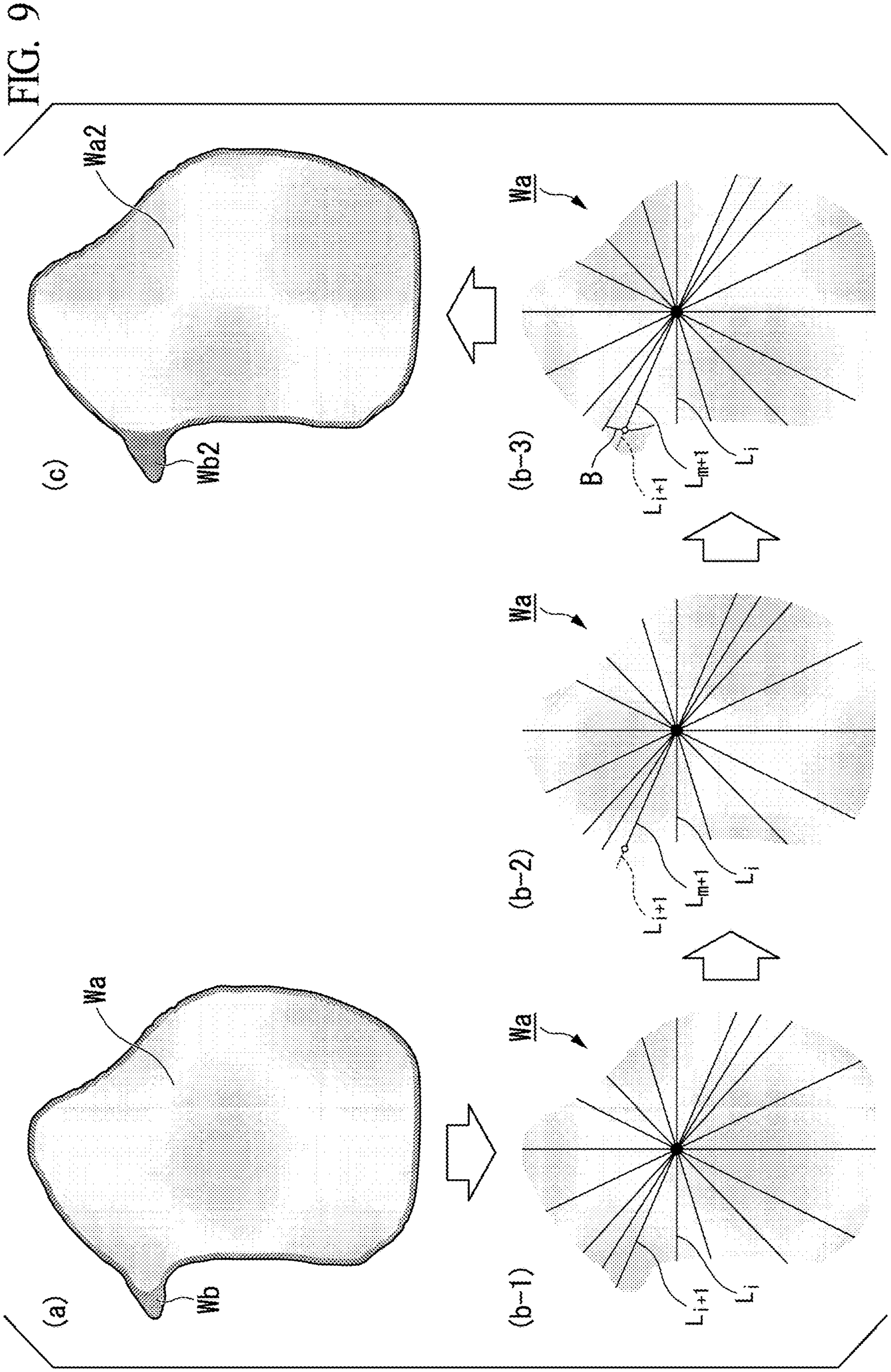
FIG. 9 is a diagram schematically showing an example of a flow of a first process of adjusting the work target region decided by the work region setting device according to the embodiment.

Meanwhile, as described above, the lawnmower 300 has no difference between the work efficiency during straight movement and the work efficiency during turning movement, but the lawnmower 200 has the work efficiency during turning movement lower than the work efficiency during straight movement. For this reason, the work region setter 150 may be configured to adjust each decided work target region in consideration of the work efficiency during straight movement and turning movement in the lawnmower 200. Here, an example of the work target region adjustment process (a first adjustment process) in the work region setter 150 will be described. FIG. 7 is a flowchart showing an example of a flow of a first process (a first adjustment process) of adjusting the work target region decided by the work region setting device 100 according to the embodiment. FIGS. 8 and 9 are diagrams schematically showing an example of the first process (the first adjustment process) of adjusting the work target region decided by the work region setting device 100 according to the embodiment. In the following description, in the flow of the first adjustment process of the work target region in the work region setting device 100 shown in FIG. 7, an example shown in FIGS. 8 and 9 will be described with reference to appropriate reference.

The first adjustment process for the work target region is performed before the decided work target region is transmitted to each of the lawnmower 200 and the lawnmower 300 so that the decided work target region is set after the work target region for each of the lawnmower 200 and the lawnmower 300 is decided according to the work target region decision process described above.

When the first adjustment process starts after the work target region for each of the lawnmower 200 and the lawnmower 300 is decided, the work region setter 150 first obtains a position of a center pixel in the work target region for the lawnmower 200. In other words, the work region setter 150 obtains coordinates of the pixel arranged at a center (a centroid) of a shape representing the work target region for the lawnmower 200 from among the pixels arranged in a two-dimensional matrix in the map information (the orthoimage). Also, the work region setter 150 obtains the distance from the obtained position of the center pixel to the pixel located on the boundary line of the work target region for the lawnmower 200 (i.e., an outer circumferential end of the work target region) (step S200).

Here, a method in which the work region setter 150 obtains the position of the center pixel in the work target region for the lawnmower 200 and the distance from the position of the center pixel to the pixel located on the boundary line of the work target region will be described with reference to FIG. 8. In FIG. 8, a state in which the work target region Wa for the lawnmower 200 is arranged on a plane with coordinates in an X-direction (a row direction or a column direction) and a Y-direction (a column direction or a row direction) is shown. First, the work region setter 150 obtains center coordinates $(x_0, y_0)$ of the work target region Wa. The coordinate $(x_0)$ of the pixel in the X-direction and the coordinates $(y_0)$ of the pixel in the Y-direction in the center coordinates $(x_0, y_0)$ can be obtained by, for example, the following Eq. (1) and the following Eq. (2).

$$x_0 = \frac{\sum_{i=1}^{N} x_i}{N} \tag{1}$$

$$y_0 = \frac{\sum_{i=1}^{N} y_i}{N} \tag{2}$$

In the above Eq. (1) and the above Eq. (2), N denotes the total number of pixels included in the work target region Wa.

Also, the work region setter 150 obtains a distance from the pixel located at the obtained center coordinates $(x_0, y_0)$ to the pixel located on the boundary line of the work target region Wa. In FIG. 8, an example in which a distance from the pixel located at the center coordinates $(x_0, y_0)$ to a pixel located at coordinates $(x_1, y_1)$ on the boundary line of the work target region Wa is obtained is shown. In this case, the work region setter 150 first obtains an inclination a of a straight line connecting the pixel located at the center coordinate ($x_0$, $y_0$) and the pixel located at the coordinates ($x_1$, $y_1$) according to the following Eq. (3).

$$\alpha = \frac{y_1 - y_0}{x_1 - x_0} \tag{3}$$

Subsequently, the work region setter 150 obtains a distance L that is the length of the straight line connecting the pixel located at the center coordinates ($x_0$, $y_0$) and the pixel located at the coordinates ($x_1$, $y_1$) according to the following Eq. (4).

$$L = \sqrt{(y_0 - y_1)^2 + (x_0 - x_1)^2} \tag{4}$$

In this way, the work region setter 150 obtains the position of the center pixel in the work target region for the lawnmower 200 and the distance L from the position of the center pixel to the pixel located on the boundary line of the work target region.

Also, the work region setter 150 obtains the difference between the distances L from pixels located adjacent to each other on the boundary line and determines whether or not the obtained difference between the distances L is less than or equal to a predetermined distance threshold value (step S210). Here, the processing of step S210 may be performed after distances L from all pixels located on the boundary line are obtained in the processing of step S200 or may be performed every time the distance L is obtained according to the processing of step S200 corresponding to at least two pixels located adjacent to each other on the boundary line. The predetermined distance threshold value is, for example, a distance (a length) for causing the work target region for the lawnmower 300 and the work target region for the lawnmower 200 to overlap. Because the work target region Wb for the lawnmower 300 and the work target region Wa for the lawnmower 200 overlap in general so that there is no work region where the lawn is not mowed on the boundary line between the work target region Wb for the lawnmower 300 and the work target region Wa for the lawnmower 200 when the lawnmower 200 and the lawnmower 300 perform lawn mowing work, the predetermined distance threshold value is a distance (a length) predetermined on the basis of this concept.

When it is determined that the difference of the distances L from pixels located adjacent to each other on the boundary line is not less than or equal to the predetermined distance threshold value in step S210, the work region setter 150 obtains a new distance (hereinafter referred to as a "distance $L_m$") at which the difference between the distances L is less than or equal to the predetermined distance threshold value on a straight line connecting a pixel with a longer distance L on the boundary line and the center pixel (step S220). At this time, the work region setter 150, for example, obtains a temporary distance by multiplying a current distance L by a predetermined shrinkage rate β and establishes the distance $L_m$ by iterating the processing (determination) of step S210 with respect to the temporary distance. That is, as shown in FIG. 7, the work region setter 150 establishes the distance $L_m$ by iterating the processing of step S220 and the processing of step S210. The work region setter 150, for example, may establish the distance $L_m$ by obtaining a distance for shortening the current distance L to the predetermined distance threshold value or less and subtracting the obtained distance from the current distance L. That is, the work region setter 150 may establish the distance $L_m$ in the processing of step S220 without iterating the processing of step S220 and the processing of step S210.

Here, an example in which the work region setter 150 obtains the distance $L_m$ will be described with reference to FIG. 8. In FIG. 8, an example in which the coordinates ($x_{m1}$, $y_{m1}$) of the position of the pixel at the new distance $L_m$ are obtained on a straight line connecting the center coordinates ($x_0$, $y_0$) of the work target region Wa and the coordinates ($x_1$, $y_1$) on the boundary line is shown. The distance $L_m$, which is the length of the straight line connecting the pixel located at the center coordinate ($x_0$, $y_0$) and the pixel located at the coordinates ($x_{m1}$, $y_{m1}$), can be obtained, for example, according to the following Eq. (5), on the basis of a concept similar to that of the method of obtaining the distance L shown in the above Eq. (4). At this time, because the pixel located at the coordinates ($x_{m1}$, $y_{m1}$) is a pixel located on a straight line connecting the pixel located at the center coordinate ($x_0$, $y_0$) and the pixel located at the coordinates ($x_1$, $y_1$) on the boundary line, an inclination am of the straight line connecting the pixel located at the center coordinate ($x_0$, $y_0$) and the pixel located at the coordinates ($x_{m1}$, $y_{m1}$) is similar to the inclination a shown in the above Eq. (3) and can be expressed as shown in the following Eq. (6).

$$L_m = \sqrt{(y_0 - y_{m1})^2 + (x_0 - x_{m1})^2} \tag{5}$$

$$\alpha_m = \frac{y_{m1} - y_0}{x_{m1} - x_0} = \alpha \tag{6}$$

In this way, the work region setter 150 obtains the position of the pixel at the obtained distance $L_m$ as the position of the pixel on the boundary line of the final work target region.

The position of the pixel located at the center coordinates ($x_0$, $y_0$) is an example of a "center position." The position of the pixel located at the coordinates ($x_1$, $y_1$) is an example of a "first position" or a "second position." A straight line connecting the pixel located at the center coordinate ($x_0$, $y_0$) and the pixel located at the coordinates ($x_1$, $y_1$) is an example of a "first straight line" or a "second straight line." A distance L, which is the length of the straight line connecting the pixel located at the center coordinate ($x_0$, $y_0$) and the pixel located at the coordinates ($x_1$, $y_1$), is an example of a "first distance" or a "second distance." The position of the pixel located at the coordinates ($x_{m1}$, $y_{m1}$) is an example of a "third position."

On the other hand, when it is determined that the difference between the distances L from pixels located adjacent to each other on the boundary line or the difference between the new distances $L_m$ obtained in the processing of step S220 is less than or equal to the predetermined distance threshold value in step S210, the work region setter 150 updates the work target region for the lawnmower 200 using a position of each pixel as a position on the boundary line (step S230).

Also, the work region setter 150 adds a region not assigned to the work target region for the lawnmower 200 to the work target region for the lawnmower 300 due to the update (step S240).

Here, an example in which the work region setter 150 updates the work target region Wa for the lawnmower 200 will be described with reference to FIG. 9. In FIG. 9(*a*), the work target region Wa for the lawnmower 200 and the work target region Wb for the lawnmower 300 decided by the work region setter 150 in the work target region decision process (see FIGS. 3 to 5) are shown. In this state, the work region setter 150 updates the work target region Wa for the lawnmower 200 in the first adjustment process for the work target region. That is, the work region setter 150 adjusts the boundary line between the work target region Wa and the work target region Wb.

In FIGS. 9(*b*-1) to 9(*b*-3), an example of a process of updating the work target region Wa for the lawnmower 200 in the first adjustment process for the work target region in the work region setter 150 is schematically shown. In FIGS. 9(*b*-1) to 9(*b*-3), for ease of description, a pixel adjacent to a pixel located at a position i on the boundary line where the distance L is initially obtained is set as a pixel located at a position i+1 away therefrom on the boundary line.

The work region setter 150 obtains a distance $L_i$ of a straight line connecting the pixel located at the center coordinate and the pixel located at the position i and further obtains a distance $L_{i+1}$ of a straight line connecting the pixel located at the center coordinate and the pixel located at the position i+1 in the processing of step S200 (see FIG. 9(*b*-1)). Also, the work region setter 150 determines whether or not a difference between the distance $L_i$ and the distance $L_{i+1}$ is less than or equal to the predetermined distance threshold value in step S210. More specifically, the work region setter 150 determines whether or not an absolute value of the difference between the distance $L_i$ and the distance $L_{i+1}$ is less than or equal to the distance threshold value. As a result of this determination indicates, when it is determined that the difference between the distance $L_i$ and the distance $L_{i+1}$ is not less than or equal to the predetermined distance threshold value, the work region setter 150 obtains a distance $L_{m+1}$ at which the difference between the distance $L_i$ and the distance $L_{i+1}$ is less than or equal to the predetermined distance threshold value on a straight line connecting the pixel located at the position i+1 of a longer distance L and the center pixel in the processing of step S200 (see FIG. 9(*b*-1)). Subsequently, when the work region setter 150 determines that the difference between the distance $L_i$ and the distance $L_{m+1}$ is less than or equal to the predetermined distance threshold value in step S210, the work region setter 150 updates the work target region Wa for the lawnmower 200 using a position of the pixel located at the position m+1 having the distance $L_{m+1}$ as the position on the final boundary line in the processing of step S230 (see FIG. 9(*b*-3)). In FIG. 9(*b*-3), a boundary line B is shown as an example of the final boundary line.

Also, the work region setter 150 adds a region that is no longer assigned to the work target region Wa for the lawnmower 200 due to an update to the work target region Wb for the lawnmower 300 in the processing of step S240. In FIG. 9(*c*), an example of a work target region Wa2 that is the work target region Wa for the lawnmower 200 and a work target region Wb2 that is the work target region Wb for the lawnmower 300 after the work region setter 150 adjusts the boundary line is shown.

The position i is an example of a "first position" and the distance $L_i$ is an example of a "first straight line." The position i+1 is an example of a "second position" and the distance $L_{i+1}$ is an example of a "second straight line."

In this first adjustment process of the work target region, the work region setter 150 adjusts the boundary line between the work target region Wa and the work target region Wb so that the number of turns that cause the deterioration in work efficiency is reduced (i.e., a ratio of straight movement with high work efficiency is high) when the lawnmower 200 mows the lawn while moving in the work target region Wa. In other words, the work region setter 150 smooths the boundary line between the work target region Wa and the work target region Wb in the first adjustment process for the work target region. Also, the work region setter 150 decides the work target regions (the work target region Wa2 and the work target region Wb2 in FIG. 9) after adjusting the boundary line as the work target regions for the lawnmower 200 and the lawnmower 300. Also, the work region setter 150 transmits the decided work target regions to the lawnmower 200 and the lawnmower 300 through the communicator 120 so that the decided work target regions are set. Thereby, each of the lawnmower 200 and the lawnmower 300 moves within the work target region decided and set by the work region setter 150 to perform lawn mowing work for mowing a lawn. Thereby, the lawnmower 200 and the lawnmower 300 each perform lawn mowing work for the entire range of map information indicated in the work range information indicated by the user. At this time, because the work target region Wa for the lawnmower 200 is adjusted to the work target region considering a work efficiency difference between the straight movement time and the turning movement time of the lawnmower 200 in the first adjustment process for the work target region in the work region setter 150, the lawnmower 200 can perform lawn mowing work while moving within the work target region Wa more efficiently than in a state in which the work target region decision process is performed.

[Second Adjustment Process for Work Target Region]

Figure 10:
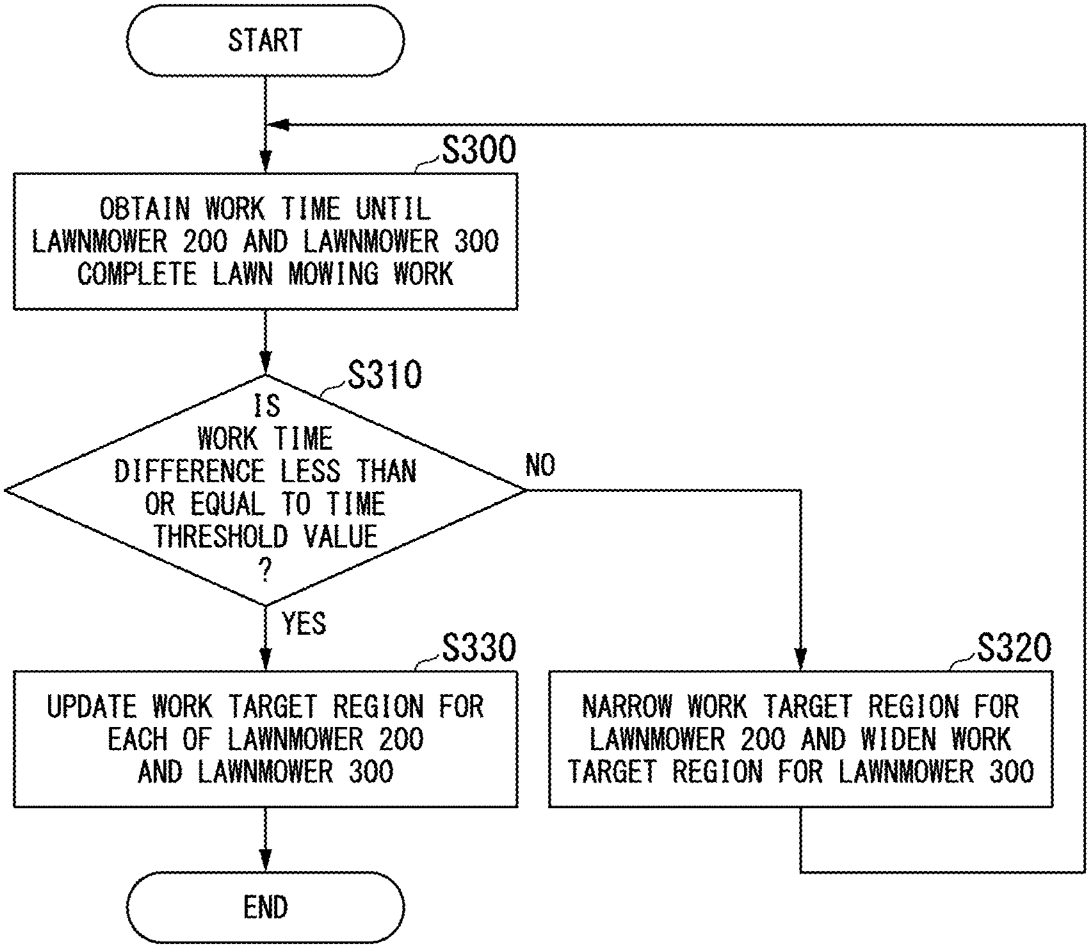
FIG. 10 is a flowchart showing an example of a flow of a second process of adjusting the work target region decided by the work region setting device according to the embodiment.

In the first adjustment process for the work target region, the lawnmower 200 and the lawnmower 300 can efficiently perform lawn mowing work by increasing the ratio at which the lawnmower 200 moves straight to perform lawn mowing work in consideration of the work efficiency difference between the straight movement time and the turning movement time of the lawnmower 200. Meanwhile, when the lawnmower 200 and the lawnmower 300 perform lawn mowing work, if the lawnmowers can complete the work in the same period (substantially simultaneously), the lawn mowing work can be performed more efficiently. For this reason, the work region setter 150 may be configured to further adjust the decided work target regions so that the lawnmower 200 and the lawnmower 300 can complete the lawn mowing work in the same period. Here, an example of a work target region adjustment process (a second adjustment process) of the work region setter 150 will be described. FIG. 10 is a flowchart showing an example of the flow of the second process (the second adjustment process) of adjusting the work target region decided by the work region setting device 100 according to the embodiment.

The second adjustment process for the work target region is performed before the work target region is transmitted to each of the lawnmower 200 and the lawnmower 300 so that the work target region is set after the work target region for each of the lawnmower 200 and the lawnmower 300 is decided according to the above-described work target region decision process or after the boundary line between the work target regions for the lawnmower 200 and the lawnmower 300 is adjusted according to the above-described first adjustment process for the work target region.

If the work region setter 150 starts the second adjustment process for the work target region, when the lawnmower 200 and the lawnmower 300 perform lawn mowing work in the current work target region, the time required to complete the lawn mowing work (the work time) is obtained (step S300).

Also, the work region setter 150 obtains a difference between the work time required for the lawnmower 200 to complete the lawn mowing work and the work time required for the lawnmower 300 to complete the lawn mowing work and determines whether or not the obtained difference between the work times is less than or equal to a predetermined time threshold value (step S310). The predetermined time threshold value is, for example, a difference between work times of the lawnmower 200 and the lawnmower 300 that can be determined to have completed the work in the same period. In other words, the predetermined time threshold value is the time that can be tolerated as the difference between the work times of the lawnmower 200 and the lawnmower 300.

When it is determined that the difference between the work times of the lawnmower 200 and the lawnmower 300 is not less than or equal to the predetermined time threshold value in step S310, the work region setter 150 narrows the work target region for the lawnmower 200 and widens the work target region for the lawnmower 300 (step S320). That is, the work region setter 150 decreases the work target region for the lawnmower 200 so that the work time is shortened and increases the work target region for the lawnmower 300 so that the work time of the lawnmower 300 is the same as the work time of the lawnmower 200. At this time, the work region setter 150 changes (adjusts) each work target region so that the work target region becomes a work target region where the lawnmower 200 is required to perform turning movement and mow the lawn in the work target region for the lawnmower 200, i.e., the work target region for the lawnmower 300, by decreasing the work target region in a direction in which the curvature of an outer circumferential end in the work target region increases (a direction in which the bending of a curve is sharp). For example, the work region setter 150 may be configured to obtain a temporary work target region by multiplying the current work target region for the lawnmower 200 by a predetermined shrinkage rate γ with respect to the temporary work target region and establish the final work target region by iterating the processing (determination) of step S310 with respect to this temporary work target region. That is, as shown in FIG. 10, the work region setter 150 may be configured to establish the final work target region by iterating the processing of step S320 and the processing of step S310 as shown in FIG. 10. The work region setter 150, for example, may be configured to obtain the work target region for the lawnmower 200 to narrow the current work time so that the current work time is less than or equal to a predetermined time threshold value and establish the final work target region by subtracting the obtained work target region from the current work target region for the lawnmower 200. That is, the work region setter 150 may be configured to establish the final work target region in the processing of step S320 without iterating the processing of step S320 and the processing of step S310.

On the other hand, when it is determined that a difference between work times of the lawnmower 200 and the lawnmower 300 or a difference between the work time of the lawnmower 200 and the work time of the lawnmower 300 for the final work target region obtained in the processing of step S320 is less than or equal to the predetermined time threshold value in step S310, the work region setter 150 updates the work target regions for the lawnmower 200 and the lawnmower 300 (step S330).

Here, a specific example of the second adjustment process for the work target region in the work region setter 150 will be described. The work region setter 150 obtains the work times of the lawnmower 200 and the lawnmower 300, for example, on the basis of information about the work efficiency included in the work machine information about each lawnmower (the work area [$m^2$/min] in which lawn mowing work can be performed per unit time) and the size (area) of the current work target region. At this time, the work region setter 150 may obtain the work time of each lawnmower in consideration of information about the work area [$m^2$/min] during straight movement, the work area [$m^2$/min] during turning movement included in the work machine information about each lawnmower, the number of times each lawnmower performs a turn along a movement path for moving within the work target region, and the like.

Here, it is assumed that the work region setter 150 obtains the work times of the lawnmower 200 and the lawnmower 300 under the following conditions and each lawnmower adjusts the work target region.

First, it is assumed that the work efficiency of the lawnmower 200 is as follows.

(Straight movement time): 50 [$m^2$/min] (Turning movement time): 10 [$m^2$/min]

On the other hand, the work efficiency of the lawnmower 300 is as follows.

(Straight movement time and turning movement time): 2 [$m^2$/min]

Also, it is assumed that the area of the work target region for the lawnmower 200 is as follows.

(Total area): 9500 [$m^2$]

(Area in which lawn mowing work is possible in straight movement): 9000 [$m^2$]

(Area in which lawn mowing work is impossible in straight movement, i.e., an area in which turning movement is required): 500 [$m^2$]

On the other hand, it is assumed that the area of the work target region for the lawnmower 300 is as follows.

(Total area): 200 [$m^2$]

In this case, the work region setter 150 obtains the following work time of the lawnmower 200 in the processing of step S300.

(Straight movement time): 9000 [$m^2$]/50 [$m^2$/min]=180 [min]

(Turning movement time): 500 [$m^2$]/10 [$m^2$/min]=50 [min]

(Total): 230 [min]

On the other hand, the work region setter 150 similarly obtains the following work time of the lawnmower 300 in the processing of step S300.

(Straight movement time and turning movement time)=(Total): 200 [$m^2$]/2 [$m^2$/min]=100 [min]

Thereby, it can be seen that the time required to complete the lawn mowing work of the lawnmower 200 is 130 [min] later than the time required to complete the lawn mowing work of the lawnmower 300. Here, it is assumed that the predetermined time threshold value is 5 [min]. In this case, the work region setter 150 determines that the difference between the work times of the lawnmower 200 and the lawnmower 300 is not less than or equal to the predetermined time threshold value in the processing of step S310.

Also, the work region setter 150 narrows an area required for turning movement in the work target region for the lawnmower 200 by 210 [$m^2$] and widens the area of the work target region for the lawnmower 300 by 210 [$m^2$] by designating an area of 210 [$m^2$] as the area of the work target region for the lawnmower 300 in the processing of step S320.

Thereby, the work region setter 150 obtains the following work time of the lawnmower 200 in the processing of step S300 again.

(Straight movement time): 9000 [$m^2$]/50 [$m^2$/min]=180 [min]

(Turning movement time): (500-210) [$m^2$]/10 [$m^2$/min]= 29 [min]

(Total): 209 [min]

The total work time that is a sum of the work time during straight movement of the lawnmower 200 and the work time during turning movement thereof is an example of a "first work time."

On the other hand, the work region setter 150 similarly obtains the following work time of the lawnmower 300 in the processing of step S300.

(Straight movement time and turning movement time)= (Total): (200+210) [$m^2$]/2 [$m^2$/min]=205 [min]

The (total) work time including the straight movement time and the turning movement time of the lawnmower 300 is an example of a "second work time."

Thereby, the work region setter 150 determines that the difference between work times of the lawnmower 200 and the lawnmower 300 is less than or equal to the predetermined time threshold value in the processing of step S310. More specifically, the work region setter 150 determines that the difference between the work times of the lawnmower 200 and the lawnmower 300 is 4 [min] less than 5 [min] that is the predetermined time threshold value. Moreover, the time required to complete the lawn mowing work of the lawnmower 200 having the most work time for the work target region is shortened from 230 [min] to 209 [min]. As a result, the entire lawn mowing work can be completed 21 [min] earlier by performing the second adjustment process for the work target region. This is because the number of times the lawnmower 200 turns is reduced by narrowing the work target region where turning movement is required in the lawnmower 200 and the decrease in work efficiency of the lawnmower 200 is suppressed.

Also, the work region setter 150 decides the area of the work target region for the lawnmower 200 as the following area in the processing of step S330.

(Area in which lawn mowing work is possible in straight movement): 9000 [$m^2$]

(Area in which turning movement is required): (500-210)= 290 [$m^2$] (Total area): 9290 [$m^2$]

On the other hand, the work region setter 150 similarly decides the area of the work target region for the lawnmower 300 as the following area in the processing of step S330.

(Total area): (200+210)=410 [$m^2$]

In the second adjustment process for the work target region, the work region setter 150 adjusts each work target region so that the work time in which the lawnmower 200 performs lawn mowing work and the work time in which the lawnmower 300 performs lawn mowing work are in the same period (substantially simultaneous). Also, the work region setter 150 decides the work target region after adjustment as the work target region for each of the lawnmower 200 and the lawnmower 300. Also, the work region setter 150 transmits the decided work target regions to the lawnmower 200 and the lawnmower 300 through the communicator 120 so that the decided work target regions are set. Thereby, each of the lawnmower 200 and the lawnmower 300 moves within the work target region decided and set by the work region setter 150 to perform lawn mowing work for mowing the lawn. Thereby, when the lawnmower 200 and the lawnmower 300 share the lawn mowing work for the entire range of the map information indicated in the work range information indicated by the user, lawn mowing work processes can be completed in the same period (substantially simultaneously).

As described above, according to the work region setting system 1 of the embodiment, the work region setter 150 provided in the work region setting device 100 decides a work target region that is a target where the lawn mowing work is shared and performed by the lawnmower 200 and the lawnmower 300. More specifically, the work region setter 150 decides a work target region Wb for the lawnmower 300 as a small lawnmower that has low work efficiency for mowing the lawn and is capable of mowing the lawn with a small turn in a narrow work region including an edge, and a work target region Wa for the lawnmower 200 as a large lawnmower that has high work efficiency for mowing the lawn, is capable of mowing the lawn in a wider work region, but is unable to mow the lawn in the narrow work region including the edge. Thereby, in the work region setting system 1 of the embodiment, the lawnmower 200 moves within the work target region Wa to perform lawn mowing work for mowing the lawn and the lawnmower 300 moves within the work target region Wb to perform lawn mowing work for mowing the lawn. Thereby, in the work region setting system 1 of the embodiment, the lawnmower 200 and the lawnmower 300 can share and perform lawn mowing work for the entire range of map information indicated in the work range information indicated by the user.

Furthermore, in the work region setting system 1 of the embodiment, the work region setter 150 provided in the work region setting device 100 adjusts the boundary line between the work target region Wa and the work target region Wb so that the number of turns that cause the deterioration in work efficiency is reduced (i.e., a ratio of straight movement with high work efficiency is high) when the lawnmower 200 mows the lawn while moving within the work target region Wa in this first adjustment process of the work target region. In other words, in the work region setting system 1 of the embodiment, the work region setter 150 makes an adjustment to smooth the boundary line between the work target region Wa and the work target region Wb in consideration of the work efficiency difference between the straight movement and turning movement of the lawnmower 200. Thereby, in the work region setting system 1 of the embodiment, when the lawnmower 200 moves within the work target region Wa and performs lawn mowing work for mowing the lawn, it is possible to efficiently mow the lawn while moving in the work target region Wa.

Furthermore, in the work region setting system 1 of the embodiment, the work region setter 150 provided in the work region setting device 100 adjusts each of the work target region Wa and the work target region Wb so that the work time in which the lawnmower 200 performs lawn mowing work and the work time in which the lawnmower 300 performs lawn mowing work are in the same period (substantially simultaneous). Thereby, in the work region setting system 1 of the embodiment, when the lawnmower 200 and the lawnmower 300 share the lawn mowing work for the entire range of the map information indicated in the work range information indicated by the user, lawn mowing work processes can be completed in the same period (substantially simultaneously).

In the above-described embodiment, a case where the work region setting device 100, for example, is configured in a computer device such as a personal computer (PC) or a server device in the work region setting system 1 has been described. However, the configuration of the work region setting device 100 in the work region setting system 1 is not limited to the configuration shown in the embodiment. For example, the configuration and function of the work region setting device 100 may be implemented in a portable terminal device used by the user, such as a smartphone or a tablet terminal. In this case, in the portable terminal device, for example, an application for implementing the function of the work region setting device 100 (for example, a work region setting application) is executed, and therefore the function of the work region setting device 100 in the above-described embodiment may be implemented. In this case, it is only necessary for the constituent elements and functions of the work region setting device in the work region setting system, the constituent elements and functions of the portable terminal device, and processes thereof to be equivalent to the constituent elements and functions of the work region setting device 100 in the above-described embodiment and processes thereof, and this can be easily conceived on the basis of the above description. Therefore, detailed description of the constituent elements and functions of the work region setting device 100 in the work region setting system and processes thereof when some or all of the constituent elements and functions are implemented in the portable terminal device is omitted.

In the above-described embodiment, a case where the work region setting device 100 decides a work target region where each of the two lawnmowers of the lawnmower 200 and the lawnmower 300 connected via the network NW performs lawn mowing work so that the work target region is set in the work region setting system 1 has been described. However, this is only an example, and the number of lawnmowers for which the work region setting device 100 decides the work target region so that the work target region is set may be even larger.

In the above-described embodiment, a case where the work machine is a lawnmower has been described. However, the work machine in which the work region setting device 100 decides the work target region so that the work target region is set is not limited to the lawnmower. For example, in addition to the lawnmower, the work machine may be an autonomous lawnmower, an autonomous blower (a device that returns the mowed lawn to a site), or the like. Further, the work machine may be, for example, an autonomous cleaning robot, an autonomous transport device that performs transportation work in the factory, an autonomous monitoring device (a so-called monitoring robot), or the like. That is, the work machine may include a plurality of types of work machines or devices that perform different work processes within a predetermined work region.

According to the above-described embodiment, a work region setting device (100) for deciding and setting a work target region that is a target where work is shared and performed by a plurality of work machines (the lawnmowers 200 and 300) that autonomously move and perform work within a work region, the work region setting device (100) including: an information acquirer (140) configured to acquire map information (an orthoimage) including at least a whole of the work region and work machine information including information about at least work efficiency of the plurality of work machines; a work region setter (150) configured to decide the work target region for each of the work machines for performing the work in a work range of a work region designated on the basis of the map information and set the decided work target region for each work machine; and a communicator (120) configured to transmit the work target region to the work machine, wherein the plurality of work machines include a first work machine (the lawnmower 200) having high work efficiency and configured not to perform the work on an edge of a boundary line located around the work range, and a second work machine (the lawnmower 300) having lower work efficiency than the first work machine and configured to perform the work on the edge, and wherein the work region setter (150) decides a region located around the work range including the edge as a second work target region (Wb) of the second work machine (the lawnmower 300) and decides a region of the work range inside of the second work target region (Wb) as a first work target region (Wa) of the first work machine (the lawnmower 200), whereby the work machines can share a more preferred work region when the plurality of work machines (the lawnmowers 200 and 300) share the work for the same work region. Thereby, the first work machine (the lawnmower 200) and the second work machine (the lawnmower 300) can share the work and more efficiently perform the work for the work range (e.g., the entire range of the map information) shown in the work range information indicated by a user.

The above-described embodiments can be represented as follows.

A work region setting device for deciding and setting a work target region that is a target where work is shared and performed by a plurality of work machines that autonomously move and perform work within a work region, the work region setting device including:

a computer including a hardware processor; and a storage device storing a program, wherein the hardware processor reads and executes the program stored in the storage device to acquire map information including at least a whole of the work region and work machine information including information about at least work efficiency of the plurality of work machines; and when the work target region is decided for each of the work machines for performing the work in a work range of a work region designated on the basis of the map information, wherein the work machines include a first work machine having high work efficiency and configured not to perform the work on an edge of a boundary line located around the work range and a second work machine having lower work efficiency than the first work machine and configured to perform the work on the edge, decide a region located around the work range including the edge as a second work target region of the second work machine, decide a region of the work range inside of the second work target region as a first work target region of the first work machine, and transmit the work target region to each work machine when the decided work target region is set for each work machine.

While embodiments of the present invention have been described above, it should be understood that these are exemplary of the invention and are not to be considered as limiting. Additions, omissions, substitutions, and other modifications can be made without departing from the spirit or scope of the present invention.

What is claimed is:

1. A work region setting device for deciding and setting a work target region that is a target where work is shared and performed by a plurality of work machines that autonomously move and perform work within a work region, the work region setting device comprising a processor configured to execute computer-readable instructions to perform:

acquiring map information including at least a whole of the work region and work machine information including information about at least work efficiency of the plurality of work machines;

deciding the work target region for each of the work machines for performing the work in a work range of a work region designated based on the map information;

setting the decided work target region for each work machine; and transmitting the work target region to the work machine, wherein the plurality of work machines include a first work machine having high work efficiency and configured not to perform the work on an edge of a boundary line located around the work range, and a second work machine having lower work efficiency than the first work machine and configured to perform the work on the edge, wherein the deciding of the work target region comprises:

deciding a region located around the work range including the edge as a second work target region of the second work machine; and deciding a region of the work range inside of the second work target region as a first work target region of the first work machine, wherein the deciding of the work target region comprises:

deciding a region of a width of a second work area in which the second work machine can perform the work per unit time along the edge of the work range as the second work target region, deciding a sequentially moved region as the first work target region so that a region of a first work area in which the first work machine can perform the work per unit time comes into contact with the inside of the second work target region, and establishing the second work target region by adding a region that is not decided to be the first work target region in the work range to the second work target region, and wherein the deciding of the work target region comprises:

determining whether a difference between a first distance of a first straight line from a center position of the first work target region to a first position on a boundary line between the first work target region and the second work target region and a second distance of a second straight line from the center position to a second position adjacent to the first position on the boundary line is less than or equal to a distance threshold value; and when a determination result indicates that the difference between the first distance and the second distance is not less than or equal to the distance threshold value, obtaining a third position where the difference is less than or equal to the distance threshold value on a straight line corresponding to a longer distance between the first distance and the second distance, updating the first work target region using the third position as a position on the boundary line, and establishing the second work target region by adding a region that is no longer the first work target region due to an update of the first work target region to the second work target region.

2. The work region setting device according to claim 1, wherein the deciding of the work target region comprises:

determining whether or not a difference between a first work time required for the first work machine to complete the work for the first work target region and a second work time required for the second work machine to complete the work for the second work target region is less than or equal to a time threshold value; and when a determination result indicates that the difference between the first work time and the second work time is not less than or equal to the time threshold value, updating the first work target region so that the first work target region is narrowed, and updating the second work target region so that the second work target region is widened by adding a decrement region by which the first work target region is narrowed due to the update of the first work target region to the second work target region.

3. The work region setting device according to claim 2, wherein the deciding of the work target region comprises:

updating the first work target region so that the first work target region is narrowed from an outer circumferential end with largest curvature in the first work target region.

4. The work region setting device according to claim 1, wherein the first work machine and the second work machine are lawnmowers.

5. A work region setting system for causing a plurality of work machines, which autonomously move and perform work within a work region, to share and perform the work, the work region setting system comprising:

a first work machine having high work efficiency and configured not to perform the work on an edge of a boundary line located around the work range;

a second work machine having lower work efficiency than the first work machine and configured to perform the work on the edge; and a work region setting device configured to decide and set a work target region that is a target where each work machine is allowed to perform the work, wherein the work region setting device comprises a processor configured to execute computer-readable instructions to perform:

acquiring map information including at least a whole of the work region and work machine information including information about at least work efficiency of the plurality of work machines;

deciding the work target region for each of the work machines for performing the work in a work range of a work region designated based on the map information;

setting the decided work target region for each work machine; and transmitting the work target region to the work machine, wherein the deciding of the work target region comprises:

deciding a region located around the work range including the edge as a second work target region of the second work machine; and deciding a region of the work range inside of the second work target region as a first work target region of the first work machine, wherein the deciding of the work target region comprises:

deciding a region of a width of a second work area in which the second work machine can perform the work per unit time along the edge of the work range as the second work target region, deciding a sequentially moved region as the first work target region so that a region of a first work area in which the first work machine can perform the work per unit time comes into contact with the inside of the second work target region, and establishing the second work target region by adding a region that is not decided to be the first work target region in the work range to the second work target region, and wherein the deciding of the work target region comprises:

determining whether a difference between a first distance of a first straight line from a center position of the first work target region to a first position on a boundary line between the first work target region and the second work target region and a second distance of a second straight line from the center position to a second position adjacent to the first position on the boundary line is less than or equal to a distance threshold value; and when a determination result indicates that the difference between the first distance and the second distance is not less than or equal to the distance threshold value, obtaining a third position where the difference is less than or equal to the distance threshold value on a straight line corresponding to a longer distance between the first distance and the second distance, updating the first work target region using the third position as a position on the boundary line, and establishing the second work target region by adding a region that is no longer the first work target region due to an update of the first work target region to the second work target region.

6. A work region setting method comprising:

acquiring, by a computer of a work region setting device for deciding and setting a work target region that is a target where work is shared and performed by a plurality of work machines that autonomously move and perform work within a work region, map information including at least a whole of the work region and work machine information including information about at least work efficiency of the plurality of work machines; and when the work target region is decided for each of the work machines for performing the work in a work range of a work region designated based on the map information, wherein the work machines include a first work machine having high work efficiency and configured not to perform the work on an edge of a boundary line located around the work range and a second work machine having lower work efficiency than the first work machine and configured to perform the work on the edge, deciding, by the computer, a region located around the work range including the edge as a second work target region of the second work machine, deciding, by the computer, a region of the work range inside of the second work target region as a first work target region of the first work machine, and transmitting, by the computer, the work target region to each work machine when the decided work target region is set for each work machine, wherein the work target region setting method comprises:

deciding, by the computer, a region of a width of a second work area in which the second work machine can perform the work per unit time along the edge of the work range as the second work target region, deciding, by the computer, a sequentially moved region as the first work target region so that a region of a first work area in which the first work machine can perform the work per unit time comes into contact with the inside of the second work target region, and establishing, by the computer, the second work target region by adding a region that is not decided to be the first work target region in the work range to the second work target region, and wherein the work region setting method comprises:

determining, by the computer, whether a difference between a first distance of a first straight line from a center position of the first work target region to a first position on a boundary line between the first work target region and the second work target region and a second distance of a second straight line from the center position to a second position adjacent to the first position on the boundary line is less than or equal to a distance threshold value; and when a determination result indicates that the difference between the first distance and the second distance is not less than or equal to the distance threshold value, obtaining, by the computer, a third position where the difference is less than or equal to the distance threshold value on a straight line corresponding to a longer distance between the first distance and the second distance, updating, by the computer, the first work target region using the third position as a position on the boundary line, and establishing, by the computer, the second work target region by adding a region that is no longer the first work target region due to an update of the first work target region to the second work target region.

7. A non-transitory computer-readable storage medium storing a program for causing a computer of a work region setting device for deciding and setting a work target region that is a target where work is shared and performed by a plurality of work machines that autonomously move and perform work within a work region to:

acquire map information including at least a whole of the work region and work machine information including information about at least work efficiency of the plurality of work machines; and when the work target region is decided for each of the work machines for performing the work in a work range of a work region designated based on the map information, wherein the work machines include a first work machine having high work efficiency and configured not to perform the work on an edge of a boundary line located around the work range and a second work machine having lower work efficiency than the first work machine and configured to perform the work on the edge, decide a region located around the work range including the edge as a second work target region of the second work machine, decide a region of the work range inside of the second work target region as a first work target region of the first work machine, and transmit the work target region to each work machine when the decided work target region is set for each work machine, wherein the non-transitory computer-readable storage medium storing the program causes the computer to:

decide a region of a width of a second work area in which the second work machine can perform the work per unit time along the edge of the work range as the second work target region, decide a sequentially moved region as the first work target region so that a region of a first work area in which the first work machine can perform the work per unit time comes into contact with the inside of the second work target region, and establish the second work target region by adding a region that is not decided to be the first work target region in the work range to the second work target region, and wherein the non-transitory computer-readable storage medium storing the program causes the computer to:

determine whether a difference between a first distance of a first straight line from a center position of the first work target region to a first position on a boundary line between the first work target region and the second work target region and a second distance of a second straight line from the center position to a second position adjacent to the first position on the boundary line is less than or equal to a distance threshold value; and when a determination result indicates that the difference between the first distance and the second distance is not less than or equal to the distance threshold value, obtain a third position where the difference is less than or equal to the distance threshold value on a straight line corresponding to a longer distance between the first distance and the second distance, update the first work target region using the third position as a position on the boundary line, and establish the second work target region by adding a region that is no longer the first work target region due to an update of the first work target region to the second work target region.

* * * * *